United States Patent [19]

Schremp

[11] 4,279,124
[45] Jul. 21, 1981

[54] SYSTEM FOR EXTRACTING SUBSURFACE WAVE ENERGY

[76] Inventor: Edward J. Schremp, 226 S. Fairfax St., Alexandria, Va. 22314

[21] Appl. No.: 5,661

[22] Filed: Jan. 10, 1979

Related U.S. Application Data

[63] Continuation-in-part of Ser. No. 858,087, Dec. 6, 1977, abandoned.

[51] Int. Cl.³ ............................................. F03B 13/12
[52] U.S. Cl. ....................................... 60/505; 60/398;
60/495; 290/53; 417/330
[58] Field of Search ................. 60/398, 495, 497, 500,
60/501, 505, 506; 290/42, 53; 417/330-332

[56] References Cited

U.S. PATENT DOCUMENTS

| | | | |
|---|---|---|---|
| 1,668,032 | 10/1928 | Blair | 60/500 |
| 3,631,670 | 1/1972 | Vassilakis | 60/500 |
| 3,758,788 | 9/1973 | Richeson | 60/500 X |
| 4,077,213 | 3/1978 | Hagen | 60/501 X |
| 4,177,643 | 12/1979 | Lorphelin | 60/506 X |

FOREIGN PATENT DOCUMENTS 2704129 8/1978 Fed. Rep. of Germany ............ 290/42

OTHER PUBLICATIONS

Salter, S. H., Jeffrey, D. C., and Taylor, J. R. M., "The Architecture of Nodding Duck Wave Power Generators", *The Naval Architect*, Jan. 1976, pp. 21-24.
Budar, K., and Falnes, J., "A Resonant Point Absorber of Ocean-Wave Power", *Nature*, vol. 256, Aug. 7, 1975, pp. 478-479.
Woolley, M., and Platts, J., "Energy on the Crest of a Wave", *New Scientist*, May 1975, pp. 241-243.
Isaacs, J. D., Castel, D., and Wick, G. L., "Utilization of the Energy in Ocean Waves", *Ocean Engineering*, vol. 3, 1976, pp. 175-187.
Katory, N., "Application of Theoretical Hydrodynamics to the Design of Wave Power Generators", *The Naval Architect*, May 1976, pp. 91-92.
Sumner, J., "A String of Nodding Ducks Puts Power on the Crest of a Wave", *The Engineer*, 18 Mar. 1976, pp. 38-39.
Panicker, N. N., "Review of the Technology for Wave Power Conversion", *MTS Journal*, vol. 10, No. 3, Apr. 1976, pp. 7-15.

*Primary Examiner*—Martin P. Schwadron
*Assistant Examiner*—Stephen F. Husar
*Attorney, Agent, or Firm*—Lowe, King, Price & Becker

[57] ABSTRACT

New and improved methods and means are described for the efficient, expeditious, economical, and safe conversion to usable form of almost all subsurface wave energy available within a predetermined annular region spanned by an array of submerged wave energy removing impellers mounted upon an annular outrigger surrounding and secured to a seagoing central platform. Maximal progressive inward attenuation of practically any state of the open sea is achieved over a very broad wave frequency band by buoyant, nonbuoyant, and neutrally buoyant impellers that function approximately as generalized simple pendulums whose natural frequencies fall at regular intervals throughout that frequency band. Optimal functioning of the impellers is achieved by assigning to their working members suitable degrees of omnidirectional response to water movement interial and drag forces, respectively. After conversion by pumps, the extracted wave energy is conveyed via a pressure transmission subsystem to a central turbine for further conversion and subsequent storage and/or product processing within the central platform.

69 Claims, 9 Drawing Figures

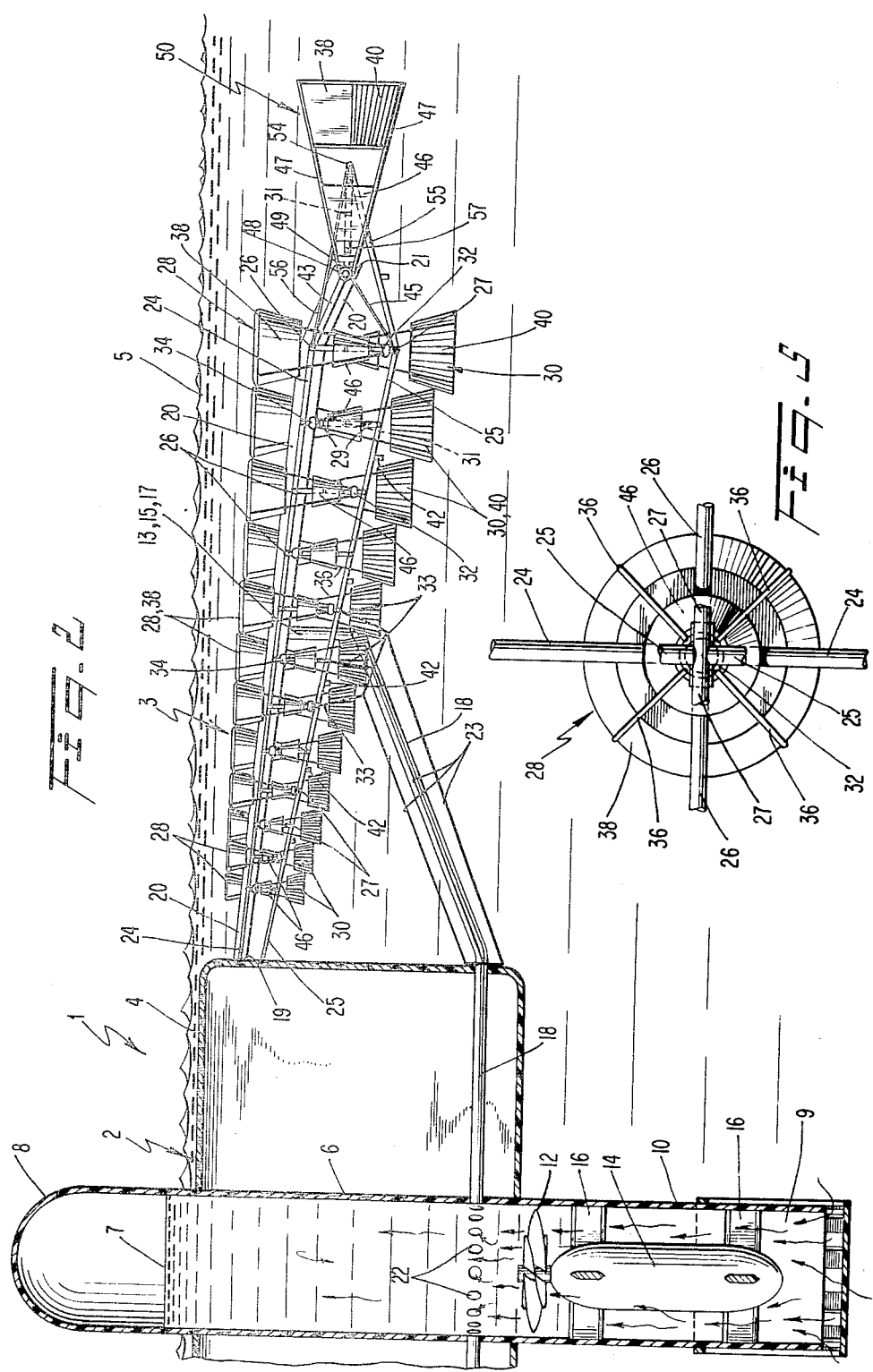

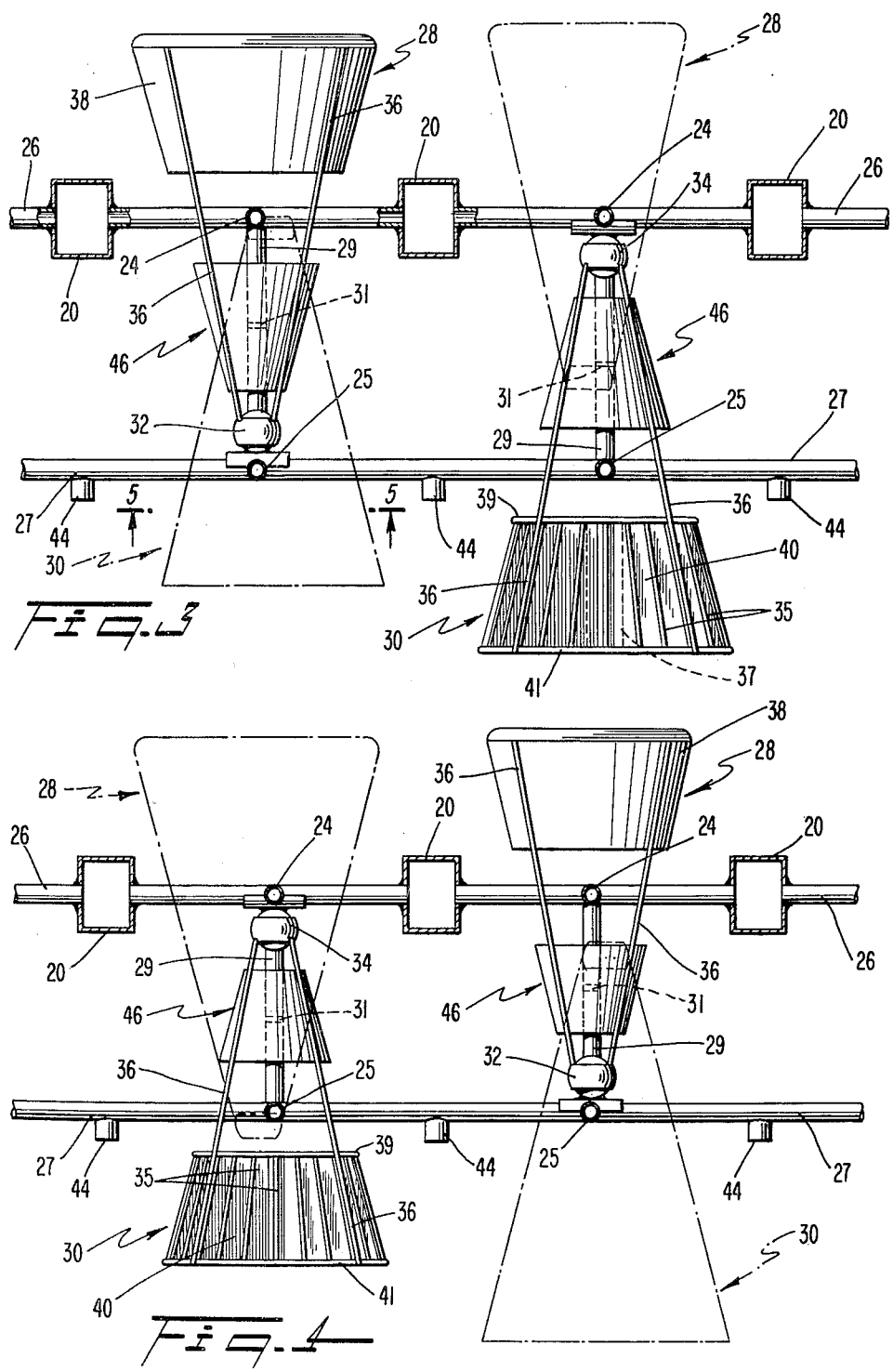

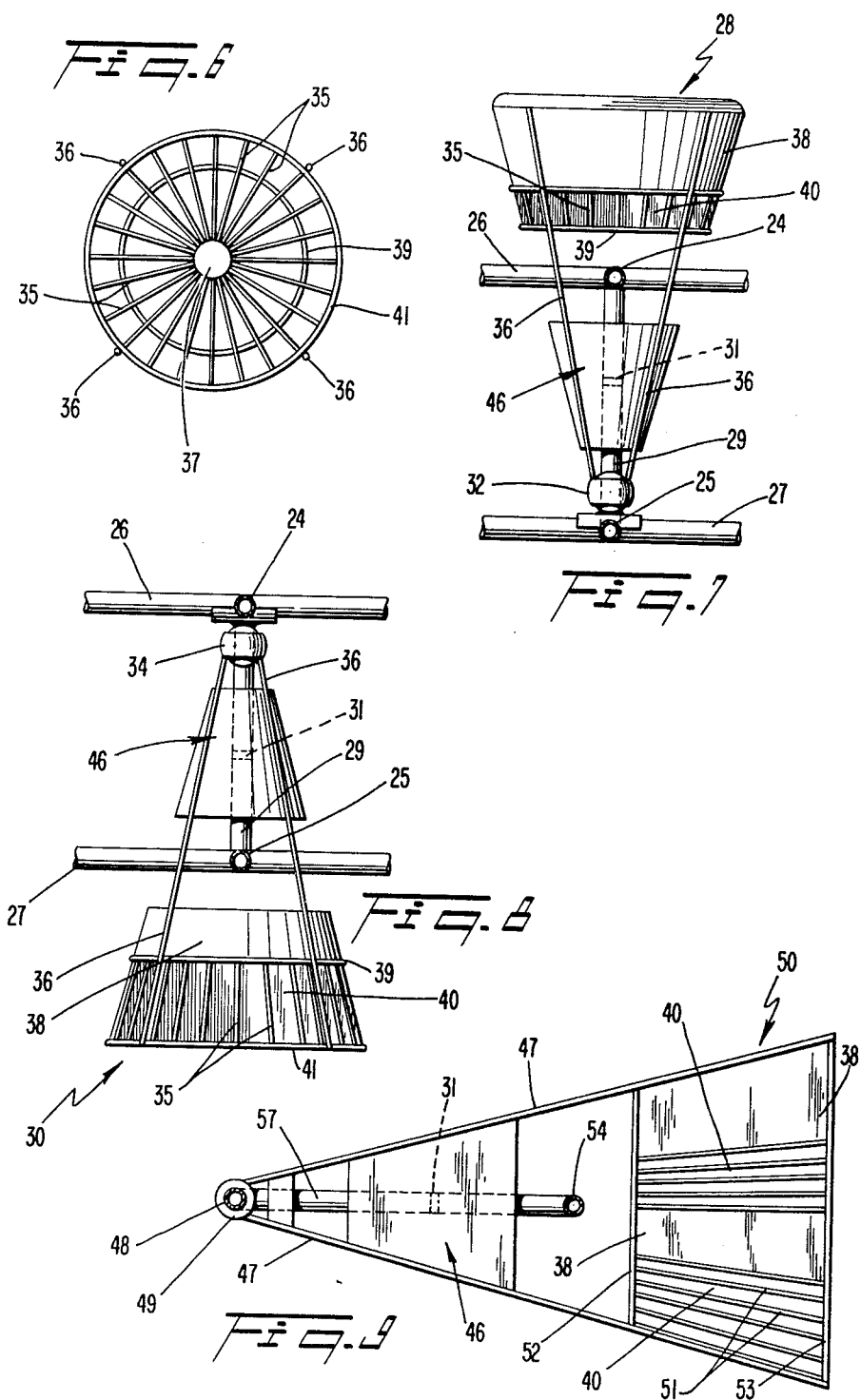

SYSTEM FOR EXTRACTING SUBSURFACE WAVE ENERGY

This is a continuation-in-part of application Ser. No. 858,087, filed Dec. 6, 1977, now abandoned.

TECHNICAL FIELD

This invention relates in general to means for and methods of extracting energy in usable form from subsurface wave action in a large body of water such as an ocean, and more particularly to a method of and system for producing this result on an arbitrarily large scale, wherein a fundamentally and wholly novel class of wave energy removing impellers responsive to subsurface water movement is made to function cooperatively as an impeller array of novel annular geometry, energetically coupled through an intermediate wave energy conversion and conveyance subsystem of corresponding annular geometry to a centralized means for performing useful work.

BACKGROUND ART

Many proposals, covering a very broad range of conceptual designs, have been made in the past for obtaining power from ocean waves. A number of these proposals, representative of this broad range, have been described by Panicker in an article entitled "Review of the Technology for Wave Power Conversion," which appeared in the April 1976 issue of the *Marine Technology Society Journal* (Vol. 10, No. 3, pp. 7-15). In that article, these proposed devices are classified into four main groups: propulsion schemes, buoy power supply devices, shore based power stations, and offshore power plants.

Except in the second group comprising power supplies for buoys and navigational aids, successful development to an advanced engineering stage has not yet been reached by any of these previously proposed devices. Recently, however, new proposals in the last group comprising offshore power plants, to which the present invention relates, have been increasing markedly both in numbers and in sophistication.

One such scheme for an offshore power plant, based on the pumping action of a free-heaving vertical pipe containing a water column that is alternately entrained and then partially replaced by means of a check valve, has been described by Isaacs, Castel, and Wick in *Ocean Engineering*, Vol. 3, pp. 175-187 (1976). This scheme, which has been developed at the Scripps Institution of Oceanography, and is intended for use primarily along undeveloped coastal regions and islands in the trade wind belts, aims at achieving a substantial wave energy densification at the site of wave energy conversion through accumulation in time, together with a broad band range of response over wave amplitude and frequency.

Another recently proposed offshore power plant, wherein the primary means for wave energy extraction would by a partially submerged, pump-driving, rocking device with a special contour in the prevailing direction of wave travel, has been described by Salter in U.S. Pat. No. 3,928,967. This device, which is presently in the model testing stage under sponsorship of the British wave energy program, and is intended for use in seas of above average significant wave height in large scale multiple combinations forming a closely ordered linear array parallel to the prevailing wave fronts, has been found under laboratory tests to be capable of achieving power conversion efficiencies greater than 50 percent over a 2:1 range of wave periods. In heavy seas, however, as noted by Katory in the May 1976 issue of *The Naval Architect* (vol. 3, pp. 91-92), there will be problems in absorbing all the energy of the waves by a single linear array of such devices.

One possible way of attempting to resolve these problems, as further suggested by Katory, and as also proposed many years ago by Brady in the rather different context of his U.S. Pat. No. 1,757,166 (see also U.S. Pat. No. 4,036,563 issued to Tornqvist), would be to subject each oncoming wave form to a rectangular 2-dimensional succession of such linear arrays of wave energy absorbers, at spaced intervals along the wave form, and to extract a portion of the wave's energy at each interval.

As will be explained below, however, the three principal features of the present invention are precisely suited to treating just such problems as these, and to doing so in a wholly novel and fundamentally different way. But since the novelty of these particular features of the present invention depends, in turn, upon the cooperative functioning of a fundamentally and wholly novel class of wave energy removing impellers responsive to subsurface water movement, reference must also be made here to the state of the prior art relating to such impellers.

Although a multitude of different versions of such impellers have been proposed in the past, practically all of those versions constitute only minor variants of one or the other of two early prototypes, disclosed, respectively, in U.S. Pat. No. 574,177 issued to Stahl and Gatewood in 1896, and in U.S. Pat. No. 793,497 issued to Ariztia in 1905. On the other hand, the improvements over these two early prototypes that will be explained below are wholly and fundamentally new, just as are the principal functions that are intended to be performed by the improved impellers described herein.

DISCLOSURE OF INVENTION

As will later be shown in detail, the present invention is best embodied in the form of an overall system for extracting subsurface wave energy, capable of operating at sea on an arbitrarily large scale of wave power output, in any one of a broad range of sea states, and at any depth up to 200 feet or more, adjustable according to the sea state.

One general object of this invention, best expressed in terms of the aforesaid overall system, is to provide new and improved means for and methods of converting to usable form the subsurface wave energy available within a certain predetermined annular region spanned by the said overall system.

Another general object of this invention is to enable the efficient, expeditious, economical, and safe operation of the said overall system.

In accordance with one broad feature of this invention, and with the two general objects thereof just mentioned, the conversion to usable form of the said subsurface wave energy is effected by means of a seagoing system that includes an inboard platform or hull, an attached outboard platform or outrigger, and a subsystem of submerged wave energy removing impellers supported upon the outrigger. The hull, which may be of circular, oval, or other suitable horizontal cross sectional shape, is completely enclosed by the impeller subsystem and supporting outrigger, which together span an immediately surrounding subsurface region, or volume of water, of corresponding generally annular horizontal cross sectional shape, with maximum horizontal dimensions at least of the same order of magnitude as the typical wavelength L of the ambient natural wave motions, and with maximum vertical dimensions whose magnitude is approximately one-tenth of the said typical wavelength L.

The principal characteristics of the impeller subsystem and of its component impellers, representative structures of which are described in detail below, are as follows:

1. The wave energy removing action of the said impeller subsystem must be applied with maximal effect at every available and utilizable subsurface location throughout the said annular region, and at every such location must be made essentially independent of the directions of travel of all ambient component progressive sinusoidal surface waves.

2. The said impeller subsystem must be made to function at every such location not only as a maximally effective primary means of extracting subsurface wave energy in usable form, but also as a maximally effective means of providing shelter from the open sea for the said enclosed hull.

3. The wave frequency spectral function specifying any given state of the open sea in statistical terms must be caused by the combined wave energy removing action of the said impeller subsystem to undergo an orderly and progressive maximal attenuation with increasing radial distance measured inwardly along any path of minimal length connecting the outermost to the innermost boundary of the said annular region.

4. The said maximal attenuation must be achieved for every wave frequency throughout a very broad wave frequency band by requiring the individual component impellers of the said impeller subsystem to be of such kinds and sizes that their correspondingly different natural frequencies will fall at regular intervals throughout the said wave frequency band, and by further requiring their independently executed resonant reaction movements in response to the ambient water movement to take place at corresponding locations within the said annular region that will be suitably correlated with their respective natural frequencies.

In accordance with a second broad feature of this invention, and with the two general objects thereof previously mentioned, an optimal combination of functional roles is achieved for each component impeller, of whatever kind and size, by assigning to each of one or more different kinds of component working members of the said impeller, for given fixed values of any preselected combination of its external design parameters, a suitable degree of positive, negative, or netural buoyancy, together with a suitable combination of values of two distinct kinds of additional internal design parameters. These two latter kinds of parameters, both of which play a major part in controlling the overall impeller function of the said component working member, are to be identified respectively with (i) the degree to which that particular kind of component working member functions as a fluid reaction surface experiencing a water movement drag force, and (ii) the degree to which it functions as a fluid reaction volume experiencing a water movement inertial force.

Here, the aforesaid optimal combination of functional roles will have been achieved for each component impeller when that impeller functions during normal operation in such a manner as to satisfy simultaneously the following conditions:

1. As a primary means of extracting subsurface wave energy is usable form, each component impeller must achieve maximal efficiency through a definite, predetermined, and operationally uniquely effective combination of oscillatory reaction movements in response, respectively, to the oscillatory drag forces and the oscillatory inertial forces exerted upon its component working member or members by the ambient water movement.

2. Its total reaction movement in response to the said ambient water movement must be approximately that of a simple harmonic oscillator of a preselected but arbitrary natural frequency, and must be composed principally of resonant oscillations of that or any closely neighboring frequency that are in tuned response to all ambient component progressive sinusoidal surface waves with a corresponding preselected narrow range of wave periods T, and that are performed with a maximal magnification factor which is essentially independent of the directions of travel of the said surface waves.

3. It must operate at a maximum depth of submergence below the water surface that is of the order of magnitude of one-tenth of the typical wavelength L of the surface waves with the said preselected narrow range of wave periods T.

4. As a rigid structure carrying a rigidly interconnected assemblage of one or more component working members, each component impeller must have maximum vertical dimensions not exceeding its maximum depth of submergence below the water surface; it must be suitably mounted upon and suitably constrained by its seagoing means of support, in a special way permitting relative motion between the said impeller and its means of support that is characteristic of its kind; and it must be energetically coupled to a means on the said support for performing useful work.

In accordance with another broad feature of this invention, and with the two general objects thereof previously mentioned, the combined wave energy removing action of the said impeller subsystem, taking place throughout the aforesaid annular region surrounding the central hull, is complemented by the cooperative action of an intermediate wave energy conversion and conveyance subsystem of corresponding annular geometry, whose function is to transmit in some usable form such as a pressure differential all wave energy extracted throughout the said annular region, to a final centralized wave energy collection subsystem located within the said central hull, and capable of performing useful work.

The scope and spirit of the specific mode of cooperative action of this combination of two mutually complementary subsystems with mutually interspersed annular geometries—the impeller subsystem and the intermediate wave energy conversion and conveyance subsystem—may perhaps best be understood in terms of the following imprecise analogy.

The ocean or other large body of water which surrounds the overall seagoing system may be loosely compared to an infinite reservoir of heat energy, whose temperature loosely represents the prevailing sea state. The aforesaid final centralized wave energy collection subsystem, located at the center of this overall seagoing system, may be loosely compared to a central heat energy sink, maintained at a constant temperature substantially lower than that of the surrounding infinite heat energy source. The just mentioned dual combination of mutually complementary subsystems—the impeller subsystem and the intermediate wave energy conversion and conveyance subsystem—may then be loosely compared to an interposed heat conductor of suitable annular shape, the exterior boundary of which abuts on the surrounding infinite heat energy source, and the interior boundary of which abuts on the central heat energy sink. The overall operating speed of this latter combination of two subsystems may thus be loosely compared to the total rate of inflow of heat through the said annular heat conductor, the overall power conversion efficiency of this dual combination of subsystems being roughly comparable to the thermal conductivity of the said heat conductor. Finally, the previously mentioned wave frequency spectral function, which quantitatively describes in statistical terms the orderly and progressive inward attenuation of the state of the sea that has been mentioned earlier as taking place thoughout the said annular region, may be loosely compared to the steady state temperature distribution throughout the said annular heat conductor.

Even though imprecise, the foregoing analogy will serve a useful purpose in casting light on a certain rather subtle but very fundamental difference in underlying point of view between the system of Salter, for example, on the one hand, and the present invention, on the other.

Among certain idealized concepts first introduced in the small amplitude linear wave theory developed by Airy and others (see, e.g., McCormick, *Ocean Engineering Wave Mechanics,* John Wiley and Sons, New York, 1973, Chapter 2) is that of the energy flux associated with a progressive sinusoidal surface wave traveling in a given direction with a well defined wave height H, wavelength L, and wave period T. It is upon this concept that attention is primarily focused in the proposal of Salter, where, under the idealized conditions of unidirectional wave propagation assumed therein, it is a helpful simplification to think in terms of the rate of transport of wave energy across a linear array of his specially contoured, directional wave energy absorbers.

In the context of realistic sea states, however, where the foregoing idealized conditions of unidirectional wave propagation rarely hold, it is preferable to regard the waves as random processes (see, e.g., Muga and Wilson, *Dynamic Analysis of Ocean Structures,* Plenum Press, New York, 1970, Chapter III). Moreover, under these more complicated conditions, the use of specially contoured, directional wave energy absorbers would be attended with serious disadvantages. If, however, use were to be made of omnidirectional wave energy absorbers like those provided here, it would then be possible to extract practically completely the water movement energy, residing within the neighborhood of a given subsurface location, that is associated with all ambient progressive surface waves traveling simultaneously in any number of different directions. With this alternative approach that is provided here, it matters little what those directions might be, or what might be the corresponding idealized individual energy fluxes in those particular directions. Instead, what matters here is simply the time history of the resultant wave related water movement forces that are exerted locally on the working member or members of each individual omnidirectional wave energy absorber employed.

Even in such alternative proposals as those of Katory, Brady, and Tornqvist, referred to above, wherein the use of a linear array of directional wave energy absorbers is improved upon by the alternative use of a corresponding rectangular 2-dimensional array, it is still the idealized conditions of unidirectional wave propagation that are being addressed, and not the above mentioned, more complicated conditions of multidirectional wave propagation that are typically encountered at sea.

Still more advantageous than the latter proposals would be one contemplating a rectangular 2-dimensional array of omnidirectional wave energy absorbers. But at this point, at which a rectangular configuration is no longer either necessary or relevant, the foregoing analogy serves to settle the question as to what would be the optimal 2-dimensional configuration in which to distribute the contemplated ensemble of individual omnidirectional wave energy absorbers. That optimal 2-dimensional configuration is thus seen to be the generally annular configuration described here.

The just mentioned disadvantages that attend the use of directional wave energy absorbers, and that are avoided in the present invention, are also avoided in the Scripps proposal referred to above. However, while the Scripps scheme is aimed at achieving a maximal wave energy densification through accumulation in time, it nevertheless cannot be so adapted as to exploit a much preferred alternative means of achieving such wave energy densification through resonance phenomena, which, because they are perfectly suited to the oscillatory nature of ocean waves, should be fully exploited if at all possible.

In the present invention, on the other hand, as has been previously pointed out, full utilization is made of resonance as a means of maximally amplifying the wave power incident upon each individual wave energy absorber. Moreover, by thus fully exploiting the individual resonance characteristics of all component wave energy absorbers, of many different kinds and sizes, and possessing many different natural frequencies, the present invention achieves, overall, a very broad band range of response over wave amplitude and frequency. But in so doing, the present invention, unlike the Scripps and Salter proposals, completely avoids the further serious disadvantage that is inherent in all wave energy extracting devices which, in order that they might have a broad band response, are made nonresonant at the cost of failing to exploit the resonance phenomenon as a means of wave power amplification.

BRIEF DESCRIPTION OF DRAWINGS

FIG. 2 is a side elevational view of the overall system, taken along the line 2—2 of FIG. 1;

FIG. 3 is an enlarged schematic sectional view taken on the line 3—3 of FIG. 1, showing also in phantom the corresponding view taken on the line 4—4 of FIG. 1;

FIG. 4 is an enlarged schematic sectional view taken on the line 4—4 of FIG. 1, showing also in phantom the corresponding view taken on the line 3—3 of FIG. 1;

FIG. 5 is a view taken along the line 5—5 of FIG. 3;

FIG. 6 is a bottom view of the nonbuoyant working member shown in FIG. 3;

FIG. 7 is an enlarged front elevational view of a possible variant of a buoyant impeller;

FIG. 8 is an enlarged front elevational view of a possible variant of a nonbuoyant impeller; and FIG. 9 is an enlarged side elevational view of a possible variant of an impeller of neutral buoyancy.

BEST MODE FOR CARRYING OUT THE INVENTION

Figure 1:
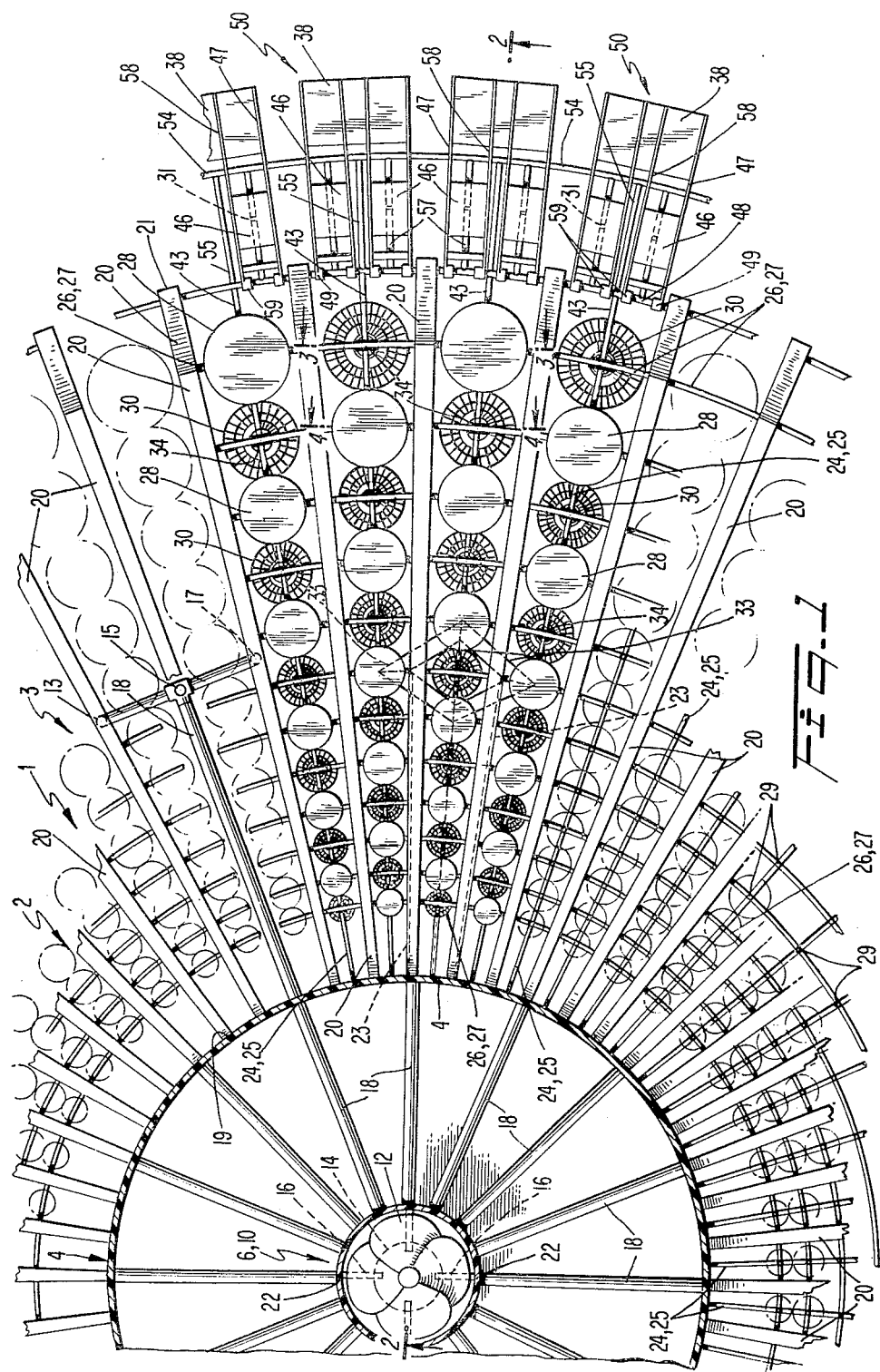
FIG. 1 is a fragmentary plan view schematically showing an overall wave energy extraction system embodying the present invention.

In this particular embodiment of the present invention, as in any variation therefrom within the scope of the appended claims, the contemplated overall wave energy extraction system is regarded as being composed of various subsystems, classifiable according to their different functions: a seagoing platform subsystem; a platform-supported wave energy removing impeller subsystem of generally annular geometry; an intermediate wave energy conversion and conveyance subsystem of corresponding annular geometry, here embodied as a pressure transmission subsystem; and a final centralized wave energy collection subsystem capable of performing useful work.

In FIGS. 1 and 2, numeral 1 designates generally the complete platform subsystem, which consists of two distinct but securely interconnected sub-subsystems: an inboard platform or hull designated generally by the numeral 2, and a completely surrounding outboard platform or outrigger designated generally by the numeral 3.

The hull 2 comprises two principal parts: a buoyant, generally doughnut-shaped exterior vessel 4; and a central chamber-defining structure 6 interior thereto. The chamber 6 is shown as being domed (FIG. 2), at 8, and as extending downwardly below the bottom of the vessel 4 to define a very large vertical conduit 10. The conduit 10 is open at the bottom under normal operating conditions so that ambient water may communicate with the chamber 6 via the conduit 10, the degree of such communication being regulated or, if necessary, annulled by means of a suitable sluice gate 9, as shown schematically in FIG. 2.

In this particular embodiment, as will be described below, the direction of water flow through conduit 10 is upwards during operation of the overall system. On the other hand, alternative embodiments of the present invention are also contemplated wherein the direction of such water flow is, instead, downwards. In either case, such water flow actuates a turbine device 12 whose runner is suitably adapted to the chosen sense of water flow and is mounted so as to drive any suitable power generating apparatus (not shown) within the shell 14. The apparatus may be in the form of an electrical generator, and/or other energy conversion means. The shell 14 is mounted centrally within the conduit 10 by means of streamlined struts 16, and is itself streamlined sufficiently to permit water to flow freely therepast in conduit 10.

In order to create such water flow in either direction, there must of course be established and maintained across the turbine device 12 a substantial and nearly constant head of water, the sign of which will correspond to the direction of the said water flow, and the magnitude of which will be a function of the overall pumping speed. The pumping speed or water flow rate is established and maintained in conduit 10 through the combined action of two of the previously mentioned subsystems: the wave energy removing impeller subsystem; and the intermediate wave energy conversion and conveyance subsystem, here embodied as a (relatively positive or negative) pressure transmission subsystem.

As shown in FIGS. 1 and 2, the innermost components of the generally annular pressure transmission subsystem are a set of conduits 18, each of which communicates at its inner end with the chamber 6 through a corresponding orifice 22, and extends radially outwardly from the chamber 6. Each conduit 18 passes through and beyond the cylindrical outer surface of the vessel 4, and communicates at its outer end, via three parallel vertical extensions 13, 15 and 17, with three corresponding radial ducts 20, approximately midway between the closed inner ends 19 and the closed outer ends 21 of the radial ducts 20. In FIG. 1, only a few of the conduits 18 and ducts 20 are shown, but it is to be understood that those illustrated are reproduced at the indicated intervals around the entire periphery of the hull 2. Thus, all of the radial ducts 20 constitute a further set of components of the generally annular pressure transmission subsystem, in communication with the chamber 6 via the conduits 18.

The interface between the generally annular pressure transmission subsystem and the generally annular impeller subsystem is composed of impeller driven pumps which can act as sources of either relatively positive or relatively negative pressure to be transmitted radially inwardly to chamber 6 via the ducts 20 and conduits 18. In this particular embodiment, wherein the impeller driven pumps act as sources of relatively negative pressure, water is withdrawn by these pumps from the ducts 20, rather than forced into them. As a result, the turbine device 12 is driven by an inflow of deep-lying ambient water directed upwardly through the conduit 10 to the chamber 6, then directed radially outwardly through conduits 18 to ducts 20, and finally, after withdrawal therefrom by the impeller driven pumps, discharged by the latter to outlying ambient subsurface surroundings.

Together, the hull 2 and the outrigger 3 form a single, integral, structurally sound, seaworthy overall platform subsystem 1 of adjustable overall buoyancy, capable of floating freely and always practically horizontally on the surface 5 of a large body of water such as an ocean, or at any desired subsurface depth up to 200 feet or more. The combined platform subsystem 1 is provided with means of self-propulsion (not shown) from one location at sea to another, from one operating depth to another, and from one operating direction to another. Subsystem 1 is further provided with means (not shown) for being moored or otherwise secured to the seabed during periods of inshore operation for maintenance, repairs, and/or the delivery of its stored energy (and processed products, if any) to distribution centers onshore.

The hull 2 is intended to house all personnel (if not unmanned), as well as features and facilities (most of which are not shown in the drawings) such as: the central turbogenerator, and/or other energy conversion means; an energy storage means; ballast tanks for fine adjustment of overall buoyancy of the overall platform subsystem 1; and seawater electrolysis, desalination, and/or other processing means. The dimensions of hull 2 are intended to be sufficiently large for it to accommodate all of the foregoing features and facilitates, together with ready means (not all shown) of access thereto at all times by personnel. In practice, the maximum wave power output of hull 2 might exceed 50 megawatts, its displacement might exceed 50,000 tons, and its draft when floating on the water surface 5 might exceed 100 feet.

Prior to operation of the overall system as contemplated in this particular embodiment, the water level 7 in chamber 6 must be adjusted to a setting above the orifices 22 of the various conduits 18 by evacuating the air space within the dome 8 as completely as possible; and the interiors of all conduits 18 and of all ducts 20 must be completely filled with water. Moreover, these conditions must be maintained unchanged throughout the subsequent operation of the overall system so as to insure the maintenance, at all times, a substantial and nearly constant head of water across the turbine device 12. As the state of the sea changes, the foregoing conditions can be maintained unchanged by suitably adjusting the sluice gate 9 to regulate the inflow of water into the conduit 10.

Shown schematically in FIG. 1, and in greater detail in FIGS. 3 and 4, are the following spatial and/or functional interrelationships between certain structural parts of the outrigger 3, the pressure transmission subsystem, and the impeller subsystem: (i) midway between every successive pair of radial ducts 20, there is located a radial pipe 24, whose closed inner end is secured to the vessel 4; (ii) laterally supporting and communicating with every radial duct 20, and also joining and communicating with every radial pipe 24, there is located a concentric series of circumferential pipes 26; (iii) through every junction point between radial pipes 24 and circumferential pipes 26, there passes an imaginary vertical axis defining the equilibrium position of a corresponding conical impeller 28 or 30; and (iv) the impellers 28 and 30, which are of positive and negative overall buoyancy, respectively, are arranged in mutually nested alternation with one another, in the closest order practicable, both radially and circumferentially.

Also shown schematically in FIG. 1, and in greater detail in FIGS. 3 and 4, is a skeletonized 2-dimensional annular structure which constitutes the upper most level of the outrigger 3, comprising and defined by the mutually intersecting and mutually intercommunicating radial pipes 24 and circumferential pipes 26, and supporting as well as communicating with all radial ducts 20. Directly below this skeletonized 2-dimensional annular structure, as may be seen from FIGS. 2-4, there is a second skeletonized 2-dimensional annular structure which constitutes the lowermost level of the outrigger 3, similarly comprising and defined by an equal number of additional mutually intersecting and mutually intercommunicating circumferential pipes 27 and radial pipes 25, whose closed inner ends are secured to the vessel 4.

As may also be seen from FIGS. 2-4, the 3-dimensional structure of the outrigger 3 is essentially completed by a set of vertical pipes 29, each of which is partitioned off into noncommunicating upper and lower sections by a plug 31, each upper section joining and communicating with a corresponding radial pipe 24 and circumferential pipe 26 at their junction point, and each lower section joining and communicating with a corresponding radial pipe 25 and circumferential pipe 27 at their junction point. The total number of vertical pipes 29 is equal to the total number of junction points between radial pipes 24 and circumferential pipes 26.

Further reinforcing the skeletonized 3-dimensional annular structure of the outrigger 3 are suitably placed diagonal struts (not shown), each of which is connected to one end of a first, and to one end of a second, corresponding vertical pipe 29.

In FIGS. 1 and 2, there is shown schematically one of several identical trusses 23 whose purpose is to provide structural support for outlying parts of the outrigger 3, as well as to enclose and support a corresponding conduit 18. The inner ends of each truss 23 are secured to the vessel 4, and the outer ends are secured to the bottom face of a corresponding auxiliary truss 33 in the form of a truncated pyramid with four lateral edges, the base of which is rigidly attached to the lowermost level of the outrigger 3 at four corresponding junction points between radial pipes 25 and circumferential pipes 27, in the manner shown in FIGS. 1 and 2.

The outrigger 3 thus appears, in FIGS. 1 and 2, as a kind of wheel completely surrounding and securely attached to the vessel 4, the wheel itself being comprised mainly of a securely connected assemblage of nonbuoyant, completely submersed, skeletonized or structurally generally open, rigid 3-dimensional component frameworks (which are not distinguished one from another in the drawings), to which all component impellers are securely linked at appropriately distributed subsurface working locations. However, while each two of the said component frameworks that are mutually adjacent are normally interconnected at their common interface in a rigid manner, when the wave induced stresses acting at that interface become too severe the rigid means of interconnection becomes temporarily replaced by a suitable articulation means (not shown in the drawings) for relieving such stresses. In a similar manner, excessive wave induced stresses acting at the common interfaces between the vessel 4 and the outrigger 3, between the vessel 4 and the trusses 23, and between the trusses 23 and 33, are relieved by the use of such articulation means.

Shown in some detail in FIG. 3 are two adjacent impellers 28 and 30, both located on the line 3—3 of FIG. 1. Both of these impellers 28 and 30 have the equilibrium orientation and symmetrical shape (as viewed without regard to their respective composite internal structures) of a vertically oriented cone of revolution whose vertex is its only point of support. Both kinds of impeller 28 and 30 function during normal operation approximately as simple pendulums, capable of oscillating in any vertical plane about their respective positions of stable equilibrium, within the respective limits defined by pipes 24 and 26 in the case of the impeller 28 (see FIG. 5), and by pipes 25 and 27 in the case of the impeller 30. For the impeller 28, whose overall buoyancy is positive, the position of stable equilibrium is vertically above its point of support 32. For the impeller 30, on the other hand, whose overall buoyancy is negative, the position of stable equilibrium is vertically below its point of support 34. The points of support 32 and 34 are to be understood as being universal pivots, illustrated in FIG. 3 as ball and socket joints 32 and 34 surrounding, respectively, the bottom of the vertical pipe 29 shown on the left, and the top of the vertical pipe 29 shown on the right.

Extending upward from the ball joint 32 supporting the impeller 28 are four struts 36 (see FIGS. 3 and 5); and extending downward from the ball joint 34 supporting the impeller 30 are four similar and similarly placed struts 36. For each of the impellers 28 and 30, the four struts 36 serve in general as a means of rigid support for an assemblage of one or more rigidly interconnected component working members, each of which reacts in a very specific and distinctive way to ambient subsurface water movement. As illustrated in FIGS. 1-3, the four struts 36 are assumed to be rigidly supporting only one working member in the case of each of the impellers 28 and 30. On the other hand, as illustrated in FIGS. 7 and 8, the four struts 36 are assumed to be rigidly supporting an assemblage of two rigidly interconnected component working members in the case of each of the impellers 28 and 30. Whatever may be the number of rigidly interconnected component working members that are supported by the four struts 36, whether for the impeller 28 or for the impeller 30, the entire assemblage of rigidly interconnected component working members will generally have the same gross external geometry (as viewed without regard to its possible internal structure), namely, that of a frustum, with specified altitude, of a cone of revolution having the overall dimensions of the said impellers 28 and 30.

In the drawings, for the sake of simplicity of illustration, specific examples are shown of only two limiting kinds of component working member: namely, (i) a component working member, generally identified as to its kind by the numeral 38, whose completely enclosing surface possesses the minimum possible water movement responsive area consistent with its gross external geometry, and whose water movement effective volume-to-surface area ratio is accordingly the maximum possible; and (ii) a component working member, generally identified as to its kind by the numeral 40, whose completely enclosing surface is given an internally multiply reentrant structure such that it thereby acquires the maximum possible water movement responsive area consistent with its gross external geometry, and whose water movement effective volume-to-surface area ratio is accordingly the minimum possible.

Moreover, in FIGS. 1 and 2, again for the sake of simplicity and of illustration, all impellers of the buoyant type 28 and of the nonbuoyant type 30, of whatever size and wherever located, are shown as having only one component working member, which is of the kind 38 or 40, respectively.

It is to be understood that the foregoing descriptions are only illustrative of the principles of the present invention. Thus, it is accordingly to be further understood that any impeller 28 or 30, of whatever size and wherever located, might differ, in practice, from those shown in FIGS. 1-4, by possessing, for example, an assemblage of two or more rigidly interconnected component working members.

As may be seen from FIGS. 3-5, the typical working member 38 is essentially devoid of internal structure. It is buoyant by virtue of being either hollow or otherwise of very low density; and, because of its aforesaid maximal volume-to-surface area ratio, it is maximally responsive to water movement inertial forces and only minimally responsive to water movement drag forces.

On the other hand, as may be seen from FIGS. 3, 4 and 6, the typical working member 40 possesses considerable internal structure through comprising, in the form illustrated here, a multiplicity of radiating vanes 35. Each vane 35 is rigidly attached at its inner edge to a central post 37 (FIG. 6), and is also rigidly attached at its two outer corners to upper and lower rigid circular bands 39 and 41, respectively, both of which are rigidly supported, in turn, by four struts 36. Furthermore, the typical working member 40, because of its aforesaid minimal volume-to-surface area ratio, must be, for structural reasons, of very high density, and therefore non-buoyant. Again, because of its minimal volume-to-surface area ratio, member 40 is maximally responsive to water movement drag forces and only minimally responsive to water movement inertial forces.

As is evident from FIGS. 1-4, both the operating depths and the dimensions of the impellers 28 and 30 increase with increasing distance measured outwardly from the vessel 4. The significance of this feature of the present invention, when implemented in combination with the above indicated opportunities for optimal choice of component working members for the individual impellers 28 and 30, and in combination with the previously mentioned mutually nested and closely ordered arrangement of these individual impellers throughout the annular region spanned by the outrigger 3, is discussed in detail elsewhere in this disclosure.

A still further important contribution to this cooperative combination of novel features, also discussed elsewhere in this disclosure, is made by the previously mentioned pressure transmission subsystem. This latter subsystem, which resembles a cardiovascular system in certain respects, may be conveniently viewed as comprising two distinct parts: a low pressure "venous" part, and a high pressure "arterial" part. The "venous" part includes the central chamber 6, the conduits 18 and their extensions 13, 15 and 17, the radial ducts 20, the upper sections of the vertical pipes 29, and the radial pipes 24 and circumferential pipes 26. The "arterial" part includes the lower sections of the pipes 29, the radial pipes 25 and circumferential pipes 27, outlets 42 and 44 that discharge water from the respective pipes 25 and 27 to the ambient subsurface surroundings, and, finally, the entire body of water surrounding the overall system.

In this particular embodiment of the present invention, as may readily be seen, the impeller driven pumps, all operating independently but in concert, produce throughout the "venous" part of this "cardiovascular system" a substantial, net reduction of pressure relative to that of the "arterial" part. In thus effecting this substantial pressure difference, a very important advantage is gained through the novel annular geometry and the resulting spatial and functional economy of the present pressure transmission subsystem.

Each of the impeller driven pumps may be any suitable pumping device mechanically coupled respectively to the fixed vertical pipes 29 and the moving struts 36 to effect pumping of water from the upper to the lower sections of the vertical pipes 29 (which, it will be recalled, are separated by plugs 31). Since a multitude of different pump designs may be employed and readily adapted by those skilled in the art, the type of pumping device is not shown in any detail in the drawings. Instead, a conical "box," labeled by the numeral 46, is used in the drawings to illustrate each individual impeller driven pumping device.

In FIGS. 1 and 2, there is shown mounted on the outrigger 3, outwardly of the radial rows of impellers 28 and 30, a further circumferential series of impellers 50, all of overall neutral buoyancy and all identical. Each of these impellers 50 functions during normal operation approximately as a simple pendulum, capable of oscillating only about a horizontal axis of support 48. Every such impeller 50 has the equilibrium position and symmetrical shape (as viewed without regard to its internal structure) of a right prism whose bases are isosceles triangles, whose two congruent rectangular lateral faces meet in a corresponding horizontal axis of support 48, and whose third rectangular lateral face lies in a vertical plane parallel to and on the side lying outwardly beyond the said axis of support 48. For each individual impeller 50, the axis of support 48 is to be understood as a corresponding segment of a circumferential pipe 48, shown in FIGS. 1 and 2 as being concentric with but exterior to the circumferential pipes 26 and 27, as being supported by and communicating with outwardly and downwardly directed radial extensions 43 of all of the radial pipes 24, as being further supported by an equal number of outwardly and upwardly directed radial struts 45 extending beyond the radial pipes 25, and as laterally supporting and communicating with all of the radial ducts 20 near their closed outer ends 21.

As may be seen from FIGS. 1 and 2, the four equal lateral edges of the above mentioned geometrically representative right prism define, for each impeller 50, four struts 47 that converge in pairs, to be joined to two corresponding pivot sleeves 49, which together enable the impeller 50 to oscillate about the circumferential pipe 48 as its axis. In a manner analogous to that described with reference to the impellers 28 and 30, these four struts 47 serve in general, for each impeller 50, as a means of rigid support for an assemblage of rigidly interconnected component working members. Here, however, the component working members always occur in pairs, one working member of each pair being of the kind generally identified by the numeral 38, and the other being of the kind generally identified by the numeral 40. As illustrated in FIGS. 1 and 2, there is only one such pair; while two such pairs are illustrated in FIG. 9. In any case, whatever may be their number, the entire assemblage of such rigidly interconnected pairs of component working members 38 and 40 will generally have the same gross external geometry (now modified so as to conform to the nonconical shape of the impellers 50), namely, that of a right prism whose bases are trapezoids having the symmetrical shape and overall dimensions shown in detail in FIG. 9.

As may be seen from FIGS. 1, 2 and 9, the typical working member 38 as employed in the impellers 50 is again essentially devoid of internal structure, just as it is when employed in the impellers 28 and 30. It is again buoyant by virtue of being either hollow or otherwise of very low density; and it is again maximally responsive to water movement inertial forces and only minimally responsive to water movement drag forces.

On the other hand, the typical working member 40 as employed in the impellers 50 again possesses considerable internal structure, this time comprising, in the form illustrated here, a multiplicity of vanes 51 extending approximately horizontally between inner and outer braces 52 and 53. Again for structural reasons, it is nonbuoyant; and again it is maximally responsive to water movement drag forces and only minimally responsive to water movement inertial forces.

In order that each impeller 50 shall be of neutral overall buoyancy, it is evidently necessary that the individual positive and negative buoyancies of its component working members 38 and 40 shall be so related as to balance out in the aggregate. As shown in FIG. 9, for example, this condition for overall neutral buoyancy is fulfilled by an impeller 50 having two pairs of component working members 38 and 40, in a configuration of alternating positive and negative buoyancies that is otherwise completely symmetrical with respect to the horizontal plane through the axis of support 48.

If, however, the impeller 50 shown in FIG. 9 were to undergo any small angular displacement from its position as illustrated, it would then be subjected to two opposing and generally unequal torques, arising respectively from the unbalanced moment arms under the action of gravity that must now be associated with each pair of component working members 38 and 40. Since such an impeller 50 will oscillate as a pedulum under the action of gravity only if the vector sum of these two opposing torques is a restoring torque, it is evidently also necessary that the greater of these two opposing torques shall be that associated with the uppermost and lowermost component working members 38 and 40 shown in FIG. 9.

In fact, for the impellers 50 shown in FIGS. 1 and 2, in each of which there appears only a single pair of component working members 38 and 40, in the same spatial relationship as that of the uppermost and lowermost component working members 38 and 40 shown in FIG. 9, the above mentioned net restoring torque has the maximum magnitude possible. However, it is again only for the sake of simplicity of illustration that all impellers 50 are thus shown in FIGS. 1 and 2 as having only one pair of component working members 38 and 40; and here again it is to be understood that, in actual practice, the impellers 50 might preferably correspond, for example, to that which is shown in FIG. 9.

As previously described with reference to the impellers 28 and 30, suitable pumping devices are provided for the impellers 50, as illustrated in FIGS. 1, 2 and 9. As before, the type of pumping device is not shown here in any detail. Instead, each individual impeller driven pumping device is illustrated here by means of a "box," again labelled by the numeral 46, but having this time the gross external geometry of a right prism whose bases are trapezoids with the symmetrical shape and overall dimensions indicated in FIG. 9.

In contrast, however, to the impellers 28 and 30, each of which drives only one pumping device 46, it will be seen from FIG. 1 that every impeller 50 drives two identical pumping devices 46, each of which is mechanically coupled respectively to one of two corresponding fixed horizontal radial pipes 57 and to four of eight corresponding moving struts 47 and 58, attached respectively to pivot sleeves 49 and 59. Both of these horizontal radial pipes 57 are partitioned off into inner "venous" and outer "arterial" sections by plugs 31, each "venous" section joining and communicating with the circumferential pipe 48, and each "arterial" section joining and communicating with an outermost circumferential pipe 54. The circumferential pipe 54 is shown in FIGS. 1 and 2 as being concentric with but exterior to the circumferential pipes 26, 27 and 48, as being supported by and communicating with outwardly and upwardly directed radial extensions 55 of all of the radial pipes 25, and as being further supported by an equal number of outwardly and downwardly directed radial struts 56 extending beyond the radial pipes 24. As may be seen from FIGS. 2 and 9, the presence of the circumferential pipe 54 sets an outer limit for the oscillatory motions of the impellers 50.

It is thus seen that the "venous" part of the previously mentioned "cardiovascular system" further includes the inner sections of the horizontal radial pipes 57, the radial extensions 43 of the radial pipes 24, and the circumferential pipe 48; and that the "arterial" part thereof further includes the outer sections of the horizontal radial pipes 57, the radial extensions 55 of the radial pipes 25, the circumferential pipe 54, and the outlets 42 and 44 that discharge water from the respective pipes 55 and 54 to the ambient subsurface surroundings. Furthermore, it is seen that the pumping devices 46 driven by the impellers 50, by effecting pumping of water from the inner to the outer sections of the horizontal radial pipes 57, make a major additional contribution towards producing throughout the "venous" part of the aforesaid "cardiovascular system" a substantial net reduction of pressure relative to that of the "arterial" part.

From FIGS. 1 and 2, it is seen that the annular outrigger 3 possesses the following characteristic structural properties: (i) both its vertical dimensions and its depth of submergence below the water surface 5 progressively increase outwardly from the vessel 4 to the outermost vertical pipes 29; (ii) in functioning as the means of support for all component impellers 28, 30 and 50, it is, in effect, of infinitely greater inertia than any individual component impeller executing wave induced oscillatory motions relative thereto, and thus will be at all times entirely free from partaking of any and all such motions; and (iii) when submerged for normal operation, because of its skeletonized or generally open structure throughout, it will itself offer minimal resistance everywhere to the ambient natural wave motions.

Because of the overall buoyancy of every individual component impeller 28, the overall impeller subsystem has the secondary but necessary characteristic property of possessing a net positive buoyancy sufficient to predominate over the negative buoyancy of the outrigger 3. Under normal operating conditions, therefore, the combined annular structure formed by the overall impeller subsystem and its supporting outrigger 3 requires no buoyant support from the vessel 4.

As previously mentioned, a further structural feature of the annular outrigger 3 is its division into component frameworks (not explicitly distinguished as component frameworks is intended for the purpose of providing articulation means (not shown in the drawings) for relieving any excessive wave induced stresses acting at the interfaces between mutually adjacent component frameworks. These component frameworks are generally of the nature of unit cells, progressively increasing both in size and in depth of submergence outwardly from the vessel 4, and forming annular subsets, each member unit cell of which exactly reproduces its circumferential next neighbor.

Typical of those unit cells which support impellers 28 and 30 is that which can be visualized with the aid of FIGS. 3 and 4 when the two views shown therein are considered in combination and in their proper spatial relationships. Thus, such a unit cell is a rigid component framework that supports, in the manner shown in FIGS. 3 and 4, two radially adjacent pairs of impellers 28 and 30, arranged in mutually nested alternation both radially and circumferentially, and differing slightly both in size and in depth of submergence below the water surface 5.

On the other hand, those unit cells which support impellers 50 have a quite different geometry, but one which may nevertheless be readily visualized with the aid of FIGS. 1 and 2. In this case, each unit cell supports only one impeller 50, and subtends at the center of the overall system only half as great an angle, in the horizontal plane, as that subtended by the typical unit cell which supports impellers 28 and 30.

As thus depicted in FIGS. 1-4, the aforesaid central angles subtended by the individual component frameworks of either kind, the number of annular subsets of component frameworks of either kind, and the choice, design, and distribution of individual impellers to be supported thereby, are all merely illustrative, and admit of any variation within the scope of the appended claims.

It has previously been noted that, as shown in FIGS. 1-4, both the operating depths and the dimensions of the impellers 28 and 30 increase with increasing distance measured outwardly from the vessel 4. Moreover, the impellers 50 located beyond the outermost and largest impellers 28 and 30 are shown as exceeding even the latter in size. The resulting radially unsymmetric distribution of component impellers 28, 30 and 50 within the overall impeller subsystem is nevertheless seen from FIG. 1 to have a circular or angular symmetry in the horizontal plane of the water surface 5.

For this particular choice, design, and distribution of component impellers 28, 30 and 50, the impellers 50 are intended to perform resonant oscillatory motions of maximal acceptable limiting amplitude in tuned omnidirectional response to ambient progressive sinusoidal surface waves of the largest or nearly largest prevailing wave heights H and wavelengths L, traveling in arbitrary directions. The impellers 28 and 30, whose respective sizes and operating depths vary monotonically from one annular subset of component frameworks to the next, are similarly intended to perform resonant oscillatory motions with correspondingly varying acceptable limiting amplitudes in tuned omnidirectional response to ambient progressive sinusoidal surface waves traveling in arbitrary directions, and having corresponding ranges of wave heights H and wavelengths L.

Furthermore, the component impellers 28, 30 and 50 may be classified as a whole, and in the first instance, with respect to their different natural frequencies, which are so specified as to range at regular intervals over a very broad frequency band, whose predetermined bandwidth and median frequency correspond, respectively, to the typical range and typical median value of the wave periods T of the prevailing ambient component progressive sinusoidal surface waves.

All of the foregoing impellers possessing the same natural frequency will generally be of the same kind and of the same dimensions, and will be supported by component frameworks belonging to the same annular subset, in the manner shown in FIGS. 1-4. Thus, all impellers 50, possessing in common the same minimal or nearly minimal natural frequency, are supported by component frameworks belonging to the outermost annular subset, as shown in FIGS. 1 and 2. As previously mentioned, however, within each component framework belonging to any one of the remaining annular subsets, there will be supported two impellers of the kind 28 and two of the kind 30, as shown in FIGS. 3 and 4. Moreover, the natural frequencies of these four impellers will differ only slightly within each pair of impellers of the same kind 28 or 30, in inverse proportion to their slightly different respective vertical dimensions; whereas, on the other hand, the said natural frequencies will differ substantially between the two pairs of impellers of different kinds 28 and 30, in inverse proportion to their substantially different respective operating depths below the water surface 5, as shown in FIG. 2.

Furthermore, for each of the two kinds of impellers 28 and 30, when viewed in the aggregate and with respect to the entire progression of annular subsets of component frameworks supporting them, the respective natural frequencies are ordered in such a way as to increase monotonically with decreasing radial distance measured outwardly from the vessel 4. However, because of the just mentioned substantial differences between the respective operating depths of homologous impellers 28 and 30, and the consequent substantial differences between their respective natural frequencies, there will be associated with the two kinds of impellers 28 and 30 two distinct sequences of natural frequencies, both of which increase monotonically in the manner just described.

The resulting total number of different natural frequencies of all component impellers 28, 30 and 50, and the half-value widths of their corresponding resonance curves, are both contemplated here to be sufficiently great to insure that, under the combined energy removing action of the overall impeller subsystem, and with decreasing radial distance measured outwardly from the vessel 4, the wave frequency spectral function specifying any given state of the open sea in statistical terms will gradually undergo, as a function of position on the water surface 5, an orderly and progressive maximal attenuation throughout the aforesaid very broad wave frequency band.

Thus, the particular choice, design, and distribution of the component impellers 28, 30 and 50 that have just been described are here intended to render the combined energy removing action of the resulting overall impeller subsystem maximally effective upon all prevailing component progressive sinusoidal surface waves of arbitrary wave heights H, wave periods T, and wavelengths L that simultaneously traverse in arbitrary directions the entire annular region spanned by the said overall impeller subsystem and its supporting outrigger 3.

As previously stated, one of the principal features of the present invention is concerned with a fundamentally and wholly novel method of achieving for each component impeller, of whatever kind and size, a certain optimal combination of functional roles that is essential to the efficient, expeditious, economical, and safe operation of the contemplated system for extracting subsurface wave energy. Among the principal required steps comprised in this method is that of producing on the part of every component impeller a total reaction movement in response to the ambient wave related water movement which is approximately that of a simple harmonic oscillator possessing a predetermined but arbitrary natural frequency, appropriate to each different kind and size of impeller.

In this particular embodiment of the present invention, every component impeller is thus made to function approximately as a simple harmonic oscillator by assigning it one of three distinct forms approximating, respectively, the following three possible alternative concrete forms of generalized simple pendulum:

(a) a simple pendulum of positive overall buoyancy, capable of oscillating in any vertical plane about a completely submerged position of stable equilibrium that is vertically above its point of support;

(b) a simple pendulum of negative overall buoyancy, capable of oscillating in any vertical plane about a completely submerged position of stable equilibrium that is vertically below its point of support; or (c) a simple pendulum of neutral overall buoyancy, capable of oscillating only about a horizontal axis of support, and having a completely submerged position of stable equilibrium that is in the same horizontal plane with the said axis of support.

It is thus evident that, as previously pointed out, the component impellers 28, 30 and 50 discussed above are intended to function approximately as generalized simple pendulums of the kinds (a), (b) and (c), respectively.

Moreover, it is intended that each component impeller 28, 30 or 50, when displaced from its completely submerged position of stable equilibrium, and when left otherwise undisturbed, shall be capable of swinging to and fro under the action of gravity and damping forces alone, its resulting damped oscillatory motion below the water surface 5 having a specified natural frequency.

Furthermore, each of the component impellers 28, 30 or 50 that has any specified natural frequency, and that is located at any corresponding site of operation within the aforesaid annular region surrounding the vessel 4, when also devised in such a way as to selectively execute a definite, predetermined, and operationally uniquely effective corresponding combination of oscillatory reaction movements in response, respectively, to the oscillatory drag forces and the oscillatory inertial forces exerted thereon by the ambient water movement, is intended to be capable of thereby executing a resonant forced oscillatory motion of maximal magnification factor in simultaneous tuned response to all component progressive sinusoidal surface waves of just one particular corresponding wave period T and of arbitrary wave heights H, traversing the said annular region in arbitrary directions.

The just noted omnidirectional response characteristics of the component impellers 28 and 30 are due in part to the previously mentioned fact that both kinds of impeller have the equilibrium orientation and symmetrical shape (as viewed without regard to their respective composite internal structures) of a vertically oriented cone of revolution whose vertex is its only point of support. Similarly, the omnidirectional response characteristics of the component impellers 50 are due in part to the previously mentioned fact that every such impeller has the equilibrium orientation and symmetrical shape (as viewed without regard to its composite internal structure) of a right prism whose bases are isosceles triangles, whose two congruent rectangular lateral faces meet in its axis of support, and whose third rectangular lateral face lies in a vertical plane parallel to the said axis of support.

Of paramount importance to achieving an optimal combination of functional roles for each component impeller, as has previously been emphasized, is the choice and design of its component working member or members. In the first place, each of the one or more component working members of any impeller 28, 30 or 50 may have an arbitrary individual buoyancy—positive, negative, or neutral—provided only that the entire assemblage of component working members yields the resultant positive, negative, or neutral overall buoyancy of the said impeller.

Further contributing to the omnidirectional response characteristics of the impellers 28 and 30 is the fact that each distinct component working member of either kind of impeller has the symmetrical shape, equilibrium orientation, and relative position of a corresponding distinct elementary frustum of a vertically oriented cone of revolution whose vertex is the point of support of a given impeller 28 or 30, there being in general a systematic, nonoverlapping progression of such elementary frustums, with predetermined individual altitudes totalling roughly one-half of the altitude of the cone of revolution whose shape is that of the said impeller as a whole.

Contributing in a similar way to the omnidirectional response characteristics of the impellers 50 is the fact that each distinct component working member of any given impeller 50 has the shape, equilibrium orientation, and relative position of a corresponding distinct elementary right prism whose bases are trapezoids, whose two nonparallel rectangular lateral faces lie in planes that meet in the axis of support of the said impeller, and whose two parallel rectangular lateral faces lie in vertical planes on one side of and parallel to the said axis of support, there being a systematic, nonoverlapping progression of such elementary right prisms, the gross external geometry of which is, as previously mentioned, that of a right prism whose bases are trapezoids having the symmetrical shape and overall dimensions shown in detail in FIG. 9.

What is of paramount importance, however, is the fact that each of the aforesaid component working members may differ in kind from others, not only through possessing a different individual buoyancy which may be either positive, negative, or neutral, and through independently possessing a different individual gross external geometry (as viewed without regard to its possible internal structure) which may be either that of a frustum of a cone of revolution or that of a right prism whose bases are trapezoids, but also through independently possessing a different combination of values of the previously mentioned two distinct kinds of internal design parameters, each of which plays an additional major part in controlling the overall impeller function of the said component working member.

As has previously been explained, these two latter kinds of parameters are to be identified respectively with (i) the degree to which any given component working member functions as a fluid reaction surface experiencing a water movement drag force, and (ii) the degree to which that component working member functions as a fluid reaction volume experiencing a water movement inertial force.

Now it is of course well known that, in the subsurface environment contemplated here, any submerged structure will experience certain oscillatory subsurface forces caused by water waves, which may be characterized as arising from the oscillatory orbital motions of the water particles at and below the surface of the body of water in question. Thus, in the first approximation given by the Airy linear wave theory (see, e.g., McCormick, supra, Chapter 2; or Muga and Wilson, supra, Chapter III), these orbital motions in the presence of a single progressive sinusoidal surface wave, and consequently also the subsurface forces to which they give rise, are oscillatory in both the vertical direction and the horizontal direction of travel of the surface wave, the orbits themselves being circular in deep water, and elliptical in shallow water beyond the surf zone.

More generally, in the presence of any arbitrarily large number of linearly superposed progressive sinusoidal surface waves traveling in arbitrary directions, and of arbitrary wave heights H, wave periods T, and wavelengths L, the components, in any given direction, of the subsurface wave forces arising from the resultant water particle orbital motions will be oscillatory everywhere except in the surf zone. In typical sea states, moreover, these oscillatory subsurface wave forces will in general possess an almost completely random vector sum that in the course of time will momentarily assume any given direction.

Now one of the previously discussed principal novel features of the present invention is based upon, and exploits for the first time in the context of the wave motor art, the fact that these oscillatory subsurface wave forces are composed of two distinct parts: a drag force and an inertial force (see, e.g., McCormick, supra, Chapter 3; or Muga and Wilson, supra, Chapter VII). Thus, at any given instant, the total oscillatory drag force acting upon a given submerged structure will be the resultant of the oscillatory normal forces that would be exerted upon the surface of the latter if it were to be placed in a steady flow pattern identical with the instantaneous oscillatory flow pattern then prevailing in the surrounding body of water. On the other hand, the corresponding total oscillatory inertial force arises entirely from the circumstance that, throughout their orbital motions, the surrounding water particles experience oscillatory accelerations. Thus, for example, in deep water and in the presence of a single progressive sinusoidal surface wave, each water particle experiences a centrifugal acceleration, directed radially outwardly from the center of its own particular circular orbit. In this case, then, there exists at any given instant and at any given point within the aforesaid submerged structure an oscillatory inertial force per unit volume, acting upon that structure, which is directed oppositely to, and is proportional to, the oscillatory centrifugal acceleration that would have been experienced by certain water particles, had they not been displaced from that particular unit volume at that particular point. In fact, this same statement still holds true when expressed in quite general terms, no matter what the surface wave conditions might be, apart from breaking wave conditions or the like.

Accordingly, the inertial force component of any given oscillatory subsurface wave force experienced by the aforesaid submerged structure will be essentially proportional to the volume of water displaced by that structure; whereas the corresponding drag force component will be essentially proportional to the surface area of the structure.

The hitherto unrecognized fact that this fundamental distinction might be exploited to great advantage in the context of the wave motor art is, then, the basis for one of the principal novel features of the present invention, the purpose and substantive content of which have already been set forth above.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

INDUSTRIAL APPLICABILITY

Ocean surface waves constitute a worldwide renewable energy resource that could potentially meet a considerable portion of human energy needs in the not too distant future. At present, however, the technology for their exploitation lags well behind that which has thus far been developed in connection with other renewable resources such as tidal, solar, and wind energy.

Against this background, and for reasons already set forth above, the present invention could well open up new avenues of approach offering unprecedented opportunities for an accelerated development of the technology for wave energy conversion. This is particularly likely because, even though described in the foregoing disclosure in terms of wave power projects on a rather large scale, the present invention could at first be implemented to great advantage on an incremental basis, at sea, without requiring excessive initial investment of funds for technological development before becoming economically competitive.

I claim:

1. An apparatus for extracting wave energy from a large body of water, comprising:
   impeller means positioned below the surface of the water and responsive to wave induced subsurface water movement;
   said impeller means comprising pluralities of wave responsive impellers distributed in a series of generally concentric rings so as to form a three-dimensionally ordered generally annular array of impellers effectively surrounding and thereby sheltering a given bounded central region at and below the surface of the water; and
   means coupled to said impeller means for performing useful work.

2. An apparatus for extracting wave energy from a large body of water, comprising:
   three different categories of impeller means having respectively a positive, a negative, and a neutral buoyancy in water;
   said three categories of impeller means being positioned below the surface of the water and being responsive to wave induced subsurface water movement; and
   means coupled to said three categories of impeller means for performing useful work.

3. An apparatus for extracting wave energy from a large body of water, comprising:
   impeller means positioned below the surface of the water and responsive to wave induced subsurface water movement;
   a support means adapted to be maintained at or below the surface of the water;
   an outrigger means essentially rigidly attached to said support means and positioned below the surface of the water;
   said impeller means comprising pluralities of wave responsive impellers coupled to said outrigger means and having respectively different ranges of movement relative to said outrigger means, different depths of submergence below the surface of the water, and different horizontal locations with respect to said support means; and
   means coupled to said impeller means for performing useful work.

4. A method of extracting from a large body of water the energy of wave induced subsurface water movement available substantially throughout a given bounded, generally annular subsurface region extending outwardly between preselected, generally concentric, inner and outer radially limiting boundaries, and extending downwardly between preselected upper and lower limiting depths below the surface of the water, said inner and outer radially limiting boundaries and said upper and lower limiting depths being predetermined functions of horizontal location relative to a given enclosed central subsurface region, comprising the steps of:
   exposing to the subsurface water movement first impeller means responsive substantially throughout a preselected, generally annular upper subregion of said generally annular subsurface region to subsurface water movement induced by ambient progressive surface waves traveling simultaneously in one or more direction,
   said first impeller means comprising pluralities of completely submerged, energy removing first impellers, each of the pluralities of first impellers having an independently preselected positive or neutral buoyancy in water and being supported within said upper subregion for oscillatory movement about a corresponding preselected equilibrium configuration in resonant and multidirectional response to a corresponding preselected narrow band of wavelengths of said wave induced subsurface water movement,
   the pluralities of first impellers being distributed in a vertically ordered succession of one or more layered series of generally concentric rings so as to form an ordered, generally annular, overall array of first impellers effectively spanning position-wise said upper subregion and effectively spanning frequency-wise a preselected, substantially broad wave frequency band, and thereby effectively surrounding and sheltering said enclosed central subsurface region;
   exposing to the subsurface water movement second impeller means responsive substantially throughout a preselected, complementary, generally annular lower subregion of said generally annular subsurface region to subsurface water movement induced by ambient progressive surface waves traveling simultaneously in one or more directions,
   said second impeller means comprising pluralities of completely submerged, energy removing second impellers, each of the pluralities of second impellers having an independently preselected negative or neutral buoyancy in water and being supported within said lower subregion for oscillatory movement about a corresponding preselected equilibrium configuration in resonant and multidirectional response to a corresponding preselected narrow band of wavelengths of said wave induced subsurface water movement,
   the pluralities of second impellers being distributed in a vertically ordered succession of one or more layered series of generally concentric rings so as to form an ordered, generally annular, overall array of second impellers effectively spanning position-wise said lower subregion and effectively spanning frequency-wise an independently preselected, substantially broad wave frequency band, and thereby effectively surrounding and further sheltering said enclosed central subsurface region;
   converting to a usable form, at the respective sites of the first and second impellers, wave energy extracted throughout said generally annular subsurface region by the first and second impellers; and
   transmitting the converted wave energy radially inwardly from the respective sites of the first and second impellers to a wave energy collection means located within said enclosed central subsurface region and capable of performing useful work.

5. A method of selectively extracting from a given subsurface region of a large body of water the available energy of subsurface water movement induced therein by ambient progressive surface waves having a preselected narrow band of wavelengths and traveling simultaneously in one or more directions, comprising the steps of:
   introducing into the subsurface region so as to be entirely surrounded thereby, and exposing to said subsurface water movement, an energy removing impeller having a natural frequency resonantly tuned to the preselected narrow band of wavelengths of said subsurface water movement;

supporting the impeller within the surrounding subsurface region for oscillatory movement about a preselected equilibrium position in resonant and multidirectional response to said subsurface water movement, the impeller occupying a substantial portion of the water contained within the surrounding subsurface region, whereby the impeller and the surrounding subsurface region have substantially the same mean depth of submergence below the surface of the water, said mean depth of submergence having a minimum value, within a given range of values corresponding to different ambient sea states, that is approximately inversely proportional to the natural frequency of the impeller, the impeller comprising one or more rigidly interconnected and multi directionally wave responsive working members, each of said working members having an independently preselected positive, negative, or neutral buoyancy in water, the preselected equilibrium position of the impeller being dependent upon said independently preselected buoyancies, and the impeller including means for executing about said preselected equilibrium position a corresponding predetermined, unique combination of resonant reaction movements in response, respectively, to oscillatory drag forces and oscillatory inertial forces simultaneously exerted upon said working member or members by said preselected narrow band of wavelengths of said wave induced subsurface water movement, said executing means being dependent upon, respectively, (i) the degree to which each working member of the impeller functions as a fluid reaction surface subjected to a water movement drag force, and (ii) the complementary degree to which said working member functions as a fluid reaction volume subjected to a water movement inertial force;

converting to a usable form, at the site of the impeller, wave energy extracted from said subsurface water movement by the impeller; and transmitting the converted wave energy from the site of the impeller to a wave energy collection means capable of performing useful work.

6. The method of claim 5, wherein said unique combination of resonant reaction movements is adapted to be a pendular movement of the impeller about a first preselected equilibrium position thereof that is vertically above a preselected point of support located within the surrounding subsurface region; the impeller being adapted to have an overall positive buoyancy in water and, upon displacement away from said first equilibrium position, being thereby subjected to an upwardly directed net hydrostatic and gravitational restoring force.

7. The method of claim 5, wherein said unique combination of resonant reaction movements is adapted to be a pendular movement of the impeller about a second preselected equilibrium position thereof that is vertically below a preselected point of support located within the surrounding subsurface region; the impeller being adapted to have an overall negative buoyancy in water and, upon displacement away from said second equilibrium position, being thereby subjected to a downwardly directed net hydrostatic and gravitational restoring force.

8. The method of claim 5, wherein said unique combination of resonant reaction movements is adapted to be a pendular movement of the impeller about a third preselected equilibrium position thereof that is oriented towards one preselected side of, coplanar with, and in a preselected principal plane of rotation perpendicular to, a preselected, substantially horizontal axis of support located within the surrounding subsurface region; the impeller being adapted to have a vertically polarized overall neutral buoyancy in water and, upon displacement away from said third equilibrium position, being thereby subjected to a net hydrostatic and gravitational restoring torque.

9. An apparatus for extracting from a large body of water the energy of wave induced subsurface water movement available substantially throughout a given bounded, generally annular subsurface region extending outwardly between preselected, generally concentric, inner and outer radially limiting boundaries, and extending downwardly between preselected upper and lower limiting depths below the surface of the water, said inner and outer radially limiting boundaries and said upper and lower limiting depths being predetermined functions of horizontal location relative to a given enclosed central subsurface region, comprising:

first impeller means responsive substantially throughout a preselected, generally annular upper subregion of said generally annular subsurface region to subsurface water movement induced by ambient progressive surface waves traveling simultaneously in one or more directions, said first impeller means comprising pluralities of completely submerged, energy removing first impellers, each of the pluralities of first impellers having an independently preselected positive or neutral buoyancy in water and being supported within said upper subregion for oscillatory movement about a corresponding preselected equilibrium configuration in resonant and multidirectional response to a corresponding preselected narrow band of wavelengths of said wave induced subsurface water movement, the pluralities of first impellers being distributed in a vertically ordered succession of one or more layered series of generally concentric rings so as to form an ordered, generally annular, overall array of first impellers effectively spanning position-wise said upper subregion and effectively spanning frequency-wise a preselected, substantially broad wave frequency band, and thereby effectively surrounding and sheltering said enclosed central subsurface region;

second impeller means responsive substantially throughout a preselected, complementary, generally annular lower subregion of said generally annular subsurface region to subsurface water movement induced by ambient progressive surface waves traveling simultaneously in one or more directions, said second impeller means comprising pluralities of completely submerged, energy removing second impellers, each of the pluralities of second impellers having an independently preselected negative or neutral buoyancy in water and being supported within said lower subregion for oscillatory movement about a corresponding preselected equilibrium configuration in resonant and multidirectional response to a corresponding preselected narrow band of wavelengths of said wave induced subsurface water movement, the pluralities of second impellers being distributed in a vertically ordered succession of one or more layered series of generally concentric rings so as to form an ordered, generally annular, overall array of second impellers effectively spanning position-wise said lower subregion and effectively spanning frequency-wise an independently preselected, substantially broad wave frequency band, and thereby effectively surrounding and further sheltering said enclosed central subsurface region;

means coupled to said first and second impeller means for converting to a usable form, at the respective sites of said first and second impellers, wave energy extracted throughout said generally annular subsurface region by said first and second impellers;

means coupled to said wave energy conversion means for transmitting the converted wave energy radially inwardly from the respective sites of said first and second impellers to the interior of said enclosed central subsurface region; and wave energy collection means located within said enclosed central subsurface region and coupled to said wave energy transmission means for performing useful work.

10. The apparatus of claim 9, wherein each of said first and second impellers selectively extracts from the large body of water the available energy of subsurface water movement induced throughout a corresponding preselected surrounding subregion of said generally annular subsurface region by ambient progressive surface waves having a corresponding preselected narrow band of wavelengths and traveling simultaneously in one or more directions; each of said first and second impellers having a natural frequency resonantly tuned to said corresponding preselected narrow band of wavelengths of ambient progressive surface waves.

11. The apparatus of claim 10, wherein each of said first and second impellers is supported within said corresponding preselected surrounding subregion for oscillatory movement about a corresponding preselected equilibrium position in resonant and multidirectional response to said corresponding preselected narrow band of wavelengths of said wave induced subsurface water movement.

12. The apparatus of claim 11, wherein each of said first and second impellers occupies a substantial portion of the water contained within said corresponding preselected surrounding subregion, whereby said impeller and said surrounding subregion have substantially the same mean depth of submergence below the surface of the water; said mean depth of submergence having a minimum value, within a given range of values corresponding to different ambient sea states, that is approximately inversely proportional to the natural frequency of said impeller.

13. The apparatus of claim 12, wherein each of said first and second impellers comprises one or more rigidly interconnected and multidirectionally wave responsive working members;

each several working member of each of said first impellers having a preselected positive, negative, or neutral buoyancy in water such that each of said first impellers has an overall positive or neutral buoyancy in water;

each several working member of each of said second impellers having a preselected positive, negative, or neutral buoyancy in water such that each of said second impellers has an overall negative or neutral buoyancy in water; and said corresponding preselected equilibrium position of each of said first and second impellers being dependent upon the positive, negative, or neutral overall buoyancy thereof in water.

14. The apparatus of claim 13, wherein each of said first and second impellers includes means for executing about said corresponding preselected equilibrium position a corresponding predetermined, unique combination of resonant reaction movements in response, respectively, to oscillatory drag forces and oscillatory inertial forces simultaneously exerted upon said working member or members by said preselected narrow band of wavelengths of said wave induced subsurface water movement; said executing means being dependent upon, respectively, (i) the degree to which each working member of said impeller functions as a fluid reaction surface subjected to a water movement drag force, and (ii) the complementary degree to which said working member functions as a fluid reaction volume subjected to a water movement inertial force.

15. The apparatus of claim 14, wherein the pluralities of said first or second impellers disposed in each of said layered series of generally concentric rings are configured for respectively different ranges of movement relative to their corresponding preselected equilibrium positions, and have respectively different mean relative depths of submergence below the surface of the water, their respective ranges of movement, their respective mean relative depths, and their respective horizontal locations relative to said enclosed central subsurface region, being predetermined functions of their respective preselected natural frequencies.

16. The apparatus of claim 15, wherein the pluralities of said first and second impellers are disposed in said generally concentric rings in a one-to-one manner, the first or second impellers disposed in each of said generally concentric rings thereby having a unique natural frequency and being resonantly responsive to a uniquely corresponding preselected narrow band of wavelengths of said wave induced subsurface water movement.

17. The apparatus of claim 16, wherein the first or second impellers disposed in each of said generally concentric rings have substantially equal ranges of movement relative to their corresponding preselected equilibrium positions, and have substantially equal mean relative depths of submergence below the surface of the water.

18. The apparatus of claim 17, wherein the pluralities of said first or second impellers disposed in each of said layered series of generally concentric rings have a corresponding independently preselected and distinct range of variation in their respective natural frequencies, and thereby also have corresponding distinct ranges of variation in their respective ranges of movement relative to their corresponding preselected equilibrium positions, and in their respective mean relative depths of submergence below the surface of the water.

19. The apparatus of claim 18, wherein the various natural frequencies of the respective pluralities of said first or second impellers disposed in each of said layered series of generally concentric rings fall at approximately regular intervals throughout a generally broad frequency response band, in such a manner that each of said layered series of generally concentric rings of said first or second impellers is responsive to a continuous, generally broad band of wavelengths of said wave induced subsurface water movement.

20. The apparatus of claim 19, wherein the various bandwidths and the various median frequencies of the respective generally broad frequency response bands of the different layered series of generally concentric rings of said first and second impellers are independently preselected in such a manner that said first and second impeller means are jointly responsive to a continuous, substantially broad band of wavelengths of said wave induced subsurface water movement.

21. The apparatus of claim 20, wherein the natural frequencies of the respective pluralities of said first or second impellers disposed in each of said layered series of generally concentric rings progressively decrease outwardly from said enclosed central subsurface region.

22. The apparatus of claim 21, wherein the ranges of movement and the mean relative depths of submergence of the respective pluralities of said first or second impellers disposed in each of said layered series of generally concentric rings progressively increase outwardly from said enclosed central subsurface region.

23. The apparatus of claim 20, wherein the pluralities of first impellers are distributed in a single upper layered series of generally concentric rings, each of said first impellers disposed in the outermost ring of said single upper layered series having a neutral buoyancy in water, and each of said first impellers disposed in other rings of said single upper layered series having a positive buoyancy in water; and wherein the pluralities of second impellers are distributed in a single lower layered series of generally concentric rings, each of said second impellers having a negative buoyancy in water.

24. The apparatus of claim 23, wherein said first and second impellers that have respectively positive and negative buoyancies in water alternate in radial and circumferential relative horizontal locations among said upper and lower layered series of generally concentric 25. The apparatus of claim 24, wherein said first and second impellers that have respectively positive and negative buoyancies in water are mutually nested.

26. The apparatus of claim 20, wherein the median frequency of the resulting joint, substantially broad frequency response band of said first and second impeller means corresponds to a typical wavelength of the ambient natural wave motions; and wherein said bounded, generally annular subsurface region has corresponding maximum horizontal dimensions at least of the same order of magnitude as said typical wavelength.

27. The apparatus of claim 20, wherein the first or second impellers disposed in each of said generally concentric rings have ranges of movement and minimum mean depths of submergence of the order of magnitude of one-tenth of the median wavelength of said corresponding preselected narrow band of wavelengths of said wave induced subsurface water movement.

28. The apparatus of claim 20, wherein said apparatus includes:

a central platform adapted to be maintained within the horizontal limits of said enclosed central subsurface region, at or below the surface of the water; and an outrigger positioned below the surface of the water and attached to and effectively surrounding said central platform;

said first and second impellers being coupled to said outrigger.

29. The apparatus of claim 28, wherein said wave energy conversion means is a fluid pumping means;

wherein said outrigger includes said wave energy transmission means; and wherein said wave energy transmission means comprises first, radial pipe means for directing a flow of pump fluid between said pumping means and said wave energy collection means and second, circumferential pipe means in fluid communication with said first pipe means.

30. An apparatus for selectively extracting from a given subsurface region of a large body of water the available energy of subsurface water movement induced therein by ambient progressive surface waves having a preselected narrow band of wavelengths and traveling simultaneously in one or more directions, comprising:

an energy removing impeller entirely surrounded by said subsurface region, having a natural frequency resonantly tuned to said preselected narrow band of wavelengths of said wave induced subsurface water movement, and being supported within said surrounding subsurface region for oscillatory movement about a preselected equilibrium position in resonant and multidirectional response to said subsurface water movement, said impeller occupying a substantial portion of the water contained within said surrounding subsurface region, whereby said impeller and said surrounding subsurface region have substantially the same mean depth of submergence below the surface of the water, said mean depth of submergence having a minimum value, within a given range of values corresponding to different ambient sea states, that is approximately inversely proportional to the natural frequency of said impeller, said impeller comprising one or more rigidly interconnected and multidirectionally wave responsive working members, each of said working members having an independently preselected positive, negative, or neutral buoyancy in water, the preselected equilibrium position of said impeller being dependent upon said independently preselected buoyancies, and said impeller including means for executing about said preselected equilibrium position a corresponding predetermined, unique combination of resonant reaction movements in response, respectively, to oscillatory drag forces and oscillatory inertial forces simultaneously exerted upon said working member or members by said preselected narrow band of wavelengths of said wave induced subsurface water movement, said executing means being dependent upon, respectively, (i) the degree to which each working member of said impeller functions as a fluid reaction surface subjected to a water movement drag force, and (ii) the complementary degree to which said working member functions as a fluid reaction volume subjected to a water movement inertial force;

means coupled to said impeller for converting to a usable form, at the site of said impeller, wave energy extracted from said subsurface water movement by said impeller; and means coupled to said wave energy conversion means for transmitting the converted wave energy from the site of said impeller to a wave energy collection means capable of performing useful work.

31. The apparatus of claim 30, wherein each of said positive buoyancy working members comprises a very low density or hollow solid with a closed outer surface so configured that said working member has a substantially large water movement effective volume-to-surface area ratio and thereby responds principally to inertial forces of said wave induced subsurface water movement.

32. The apparatus of claim 30, wherein each of said negative buoyancy working members comprises a solid with an exposed, multiply re-entrant outer surface so configured that said working member has a substantially small water movement effective volume-to-surface area ratio and thereby responds principally to drag forces of said wave induced subsurface water movement.

33. The apparatus of claim 32, wherein said multiply re-entrant outer surface comprises a series of vanes.

34. The apparatus of claim 30, wherein said unique combination of resonant reaction movements is adapted to be a pendular movement of said impeller about a first preselected equilibrium position thereof that is vertically above a preselected point of support located within said surrounding subsurface region; said impeller being adapted to have an overall positive buoyancy in water and, upon displacement away from said first equilibrium position, being thereby subjected to an upwardly directed net hydrostatic and gravitational restoring force.

35. The apparatus of claim 30, wherein said unique combination of resonant reaction movements is adapted to be a pendular movement of said impeller about a second preselected equilibrium position thereof that is vertically below a preselected point of support located within said surrounding subsurface region; said impeller being adapted to have an overall negative buoyancy in water and, upon displacement away from said second equilibrium position, being thereby subjected to a downwardly directed net hydrostatic and gravitational restoring force.

36. The apparatus of claim 34 or 35, including multidirectional pivoting means for constraining said impeller to execute spherical pendular motion about said point of support.

37. The apparatus of claim 36, wherein said impeller has the position at equilibrium and the external form of a solid that is symmetric about a vertical axis containing said point of support, the symmetry of said solid with respect to said vertical axis being substantially that of a circumscribed solid of revolution.

38. The apparatus of claim 37, wherein said vertically oriented solid is a cone of revolution, the vertex of said cone being confined by said multidirectional pivoting means to a substantially small neighborhood of said point of support.

39. The apparatus of claim 30, wherein said unique combination of resonant reaction movements is adapted to be a pendular movement of said impeller about a third preselected equilibrium position thereof that is oriented towards one preselected side of, coplanar with, and in a preselected principal plane of rotation perpendicular to, a preselected, substantially horizontal axis of support located within said surrounding subsurface region; said impeller being adapted to have a vertically polarized overall neutral buoyancy in water and, upon displacement away from said third equilibrium position, being thereby subjected to a net hydrostatic and gravitational restoring torque.

40. The apparatus of claim 39, including unidirectional pivoting means for constraining said impeller to execute angular oscillatory motion dihedrally about said substantially horizontal axis of support.

41. The apparatus of claim 40, wherein said impeller includes at least one pair of said working members having respectively positive and negative buoyancies in water, said working members being individually disposed buoyancy-wise in an alternating and internally asymmetric spatial relationship such that any angular displacement of said impeller away from said third equilibrium position causes a net hydrostatic and gravitational restoring torque to act thereon.

42. The apparatus of claim 41, wherein said impeller has the position at equilibrium and the external form of a horizontally oriented wedge that is symmetric under reflection both (i) in a preselected principal plane of rotation about said substantially horizontal axis of support, and (ii) in a substantially horizontal half-plane containing and bounded by said axis; the line of intersection of said principal plane and said half-plane being horizontally oriented towards one preselected side of, and issuing perpendicularly from, said substantially horizontal axis of support.

43. A method of extracting wave energy from a large body of water, comprising the steps of exposing to wave induced subsurface water movement first wave responsive impeller means having a positive buoyancy in water; exposing to the wave induced subsurface water movement second wave responsive impeller means having a negative buoyancy in water; exposing to the wave induced subsurface water movement third wave responsive impeller means having a neutral buoyancy in water; converting the resulting wave induced forces exerted upon said first, second, and third impeller means to a composite force; and applying the composite force to a load.

44. An apparatus for extracting wave energy from a large body of water, comprising:

an energy removing impeller positioned below the surface of the water and selectively responsive to the accelerated state of ambient wave induced subsurface water movement, said impeller including means for executing a preselected, distinct reaction movement in response to said accelerated state of ambient wave induced subsurface wave movement, said executing means comprising (i) a first portion of said impeller that has a substantially large water movement effective volume-to-surface area ratio such that said first portion is responsive principally to inertial forces of wave induced subsurface water movement and (ii) a second portion of said impeller that has a substantially small water movement effective volume-to-surface area ratio such that said second portion is responsive principally to drag forces of wave induced subsurface water movement, and said first and second wave responsive portions being both rigid and rigidly interconnected; and means coupled to said impeller for performing useful work.

45. The apparatus of claim 44, wherein said impeller responds principally to inertial forces of wave induced subsurface water movement.

46. The apparatus of claim 44, wherein said impeller responds principally to drag forces of wave induced subsurface water movement.

47. The apparatus of claim 44, wherein said impeller responds approximately equally to inertial forces and drag forces of wave induced subsurface water movement.

48. An apparatus for extracting wave energy from a large body of water, comprising:
three different categories of impeller means that are responsive respectively (i) principally to inertial forces of wave induced subsurface water movement, (ii) principally to drag forces of wave induced subsurface water movement, and (iii) approximately equally to inertial forces and drag forces of wave induced subsurface water movement,
said three categories of impeller means being positioned below the surface of water; and
means coupled to said three categories of impeller means for performing useful work.

49. A method of extracting wave energy from a large body of water, comprising the steps of:
exposing to wave induced subsurface water movement an impeller means that is selectively responsive to the accelerated state of said wave induced subsurface water movement,
said impeller means comprising a series of n distinct sets $S_1, S_2, \ldots, S_n$ of completely submerged, energy removing impellers $I_1, I_2, \ldots, I_n$ (the integer n being greater than 1),
each of the sets $S_r$ of impellers $I_r$ (where $r = 1, 2, \ldots, n$) including means $M_r$ for selectively executing a corresponding predetermined, unique combination of movements in response, respectively, to drag forces and inertial forces simultaneously exerted upon said set $S_r$ of impellers $I_r$ by said wave induced subsurface water movement,
the selective responsiveness of said executing means $M_r$ to said accelerated state of wave induced subsurface water movement being dependent upon, respectively, (i) the degree to which each impeller $I_r$ functions as a fluid reaction surface subjected to a water movement drag force, and (ii) the complementary degree to which said impeller $I_r$ functions as a fluid reaction volume subjected to a water movement inertial force, and
there being effectively only a hydrodynamical interaction, and no mechanical coupling, between any two distinct impellers $I_r$ and $I_s$ (where $s = 1, 2, \ldots, n$);
converting the resulting water movement drag forces and inertial forces exerted upon the respective sets $S_1, S_2, \ldots, S_n$ of said impellers $I_1, I_2, \ldots, I_n$ to a composite force; and
applying the composite force to a load.

50. An apparatus for extracting wave energy from a large body of water, comprising:
an impeller means that is selectively responsive to the accelerated state of ambient wave induced subsurface water movement,
said impeller means comprising a series of n distinct sets $S_1, S_2, \ldots, S_n$ of completely submerged, energy removing impellers $I_1, I_2, \ldots, I_n$ (the integer n being greater than 1);
each of the sets $S_r$ of impellers $I_r$ (where $r = 1, 2, \ldots, n$) including means $M_r$ for selectively executing a corresponding predetermined, unique combination of movements in response, respectively, to drag forces and inertial forces simultaneously exerted upon said set $S_r$ of impellers $I_r$ by said ambient wave induced subsurface water movement,
the selective responsiveness of said executing means $M_r$ to said accelerated state of ambient wave induced subsurface water movement being dependent upon, respectively, (i) the degree to which each impeller $I_r$ functions as a fluid reaction surface subjected to a water movement drag force, and (ii) the complementary degree to which said impeller $I_r$ functions as a fluid reaction volume subjected to a water movement inertial force, and
there being effectively only a hydrodynamical interaction, and no mechanical coupling, between any two distinct impellers $I_r$ and $I_s$ (where $s = 1, 2, \ldots, n$); and
means coupled to said impeller means for performing useful work.

51. The apparatus of claim 50, wherein the impellers making up $n_1$ of said n distinct sets of impellers comprise first impellers responding principally to inertial forces of said ambient wave induced subsurface water movement, and the impellers making up the remaining $n_2$ of said n distinct sets of impellers comprise second impellers responding principally to drag forces of said ambient wave induced subsurface water movement (each of the integers $n_1$ and $n_2$ being greater than zero and such that $n_1 + n_2 = n$).

52. The apparatus of claim 50, wherein the impellers making up $n_1$ of said n distinct sets of impellers comprise first impellers responding principally to inertial forces of said ambient wave induced subsurface water movement, the impellers making up $n_2$ of the remainder of said n distinct sets of impellers comprise second impellers responding principally to drag forces of said ambient wave induced subsurface water movement, and the impellers making up the remaining $n_3$ of said n distinct sets of impellers comprise third impellers responding approximately equally to inertial forces and drag forces of said ambient wave induced subsurface water movement (each of the integers $n_1$, $n_2$, and $n_3$ being greater than zero and such that $n_1 + n_2 + n_3 = n$).

53. An apparatus for extracting wave energy from a large body of water, comprising:
an impeller positioned below the surface of the water and responsive to wave induced subsurface water movement,
said impeller including (i) a first wave responsive portion that has a positive buoyancy in water and (ii) a second wave responsive portion that has a negative buoyancy in water,
said first and second wave responsive portions being both rigid and rigidly interconnected; and
means coupled to said impeller for performing useful work.

54. The apparatus of claim 53, wherein said impeller has a positive overall buoyancy in water.

55. The apparatus of claim 53, wherein said impeller has a negative overall buoyancy in water.

56. The apparatus of claim 53, wherein said impeller has a neutral overall buoyancy in water.

57. An apparatus for extracting wave energy from a large body of water, comprising:

impeller means positioned below the surface of the water and responsive to wave induced subsurface water movement, said impeller means comprising a series of n distinct sets $S_1, S_2, \ldots, S_n$ of energy removing impellers $I_1, I_2, \ldots, I_n$ (the integer n being greater than 1), the impellers making up $n_1$ of said n distinct sets of impellers having a positive buoyancy in water, and the impellers making up the remaining $n_2$ of said n distinct sets of impellers having a negative buoyancy in water (each of the integers $n_1$ and $n_2$ being greater than zero and such that $n_1+n_2=n$), and there being effectively only a hydrodynamical interaction, and no mechanical coupling, between any two distinct impellers $I_r$ and $I_s$ (where r, s = 1, 2, ..., n); and means coupled to said impeller means for performing useful work.

58. The apparatus of claim 2 or 48 or 50 or 57, wherein said apparatus includes pluralities of impellers having respectively different unique natural frequencies and thereby being resonantly responsive to different preselected bands of wavelengths of wave induced subsurface water movement.

59. A method of extracting wave energy from a large body of water, comprising the steps of:

exposing to wave induced subsurface water movement a wave responsive impeller means comprising a series of n distinct sets $S_1, S_2, \ldots, S_n$ of completely submerged, energy removing impellers $I_1, I_2, \ldots, I_n$ (the integer n being greater than 1), each of the sets $S_r$ of impellers $I_r$ (where r = 1, 2, ..., n) having a unique natural frequency $f_r$ and thereby being resonantly responsive to a preselected, distinct band of wavelengths $B_r$ of said wave induced subsurface water movement, and there being effectively only a hydrodynamical interaction, and no mechanical coupling, between any two distinct impellers $I_r$ and $I_s$ (where s = 1, 2, ..., n);

converting the resulting wave induced forces exerted upon the respective sets $S_1, S_2, \ldots, S_n$ of said impellers $I_1, I_2, \ldots, I_n$ to a composite force; and applying the composite force to a load.

60. An apparatus for extracting wave energy from a large body of water, comprising:

impeller means positioned below the surface of the water and responsive to wave induced subsurface water movement, said impeller means comprising a series of n distinct sets $S_1, S_2, \ldots, S_n$ of energy removing impellers $I_1, I_2, \ldots, I_n$ (the integer n being greater than 1), each of the sets $S_r$ of impellers $I_r$ (where r = 1, 2, ..., n) having a unique natural frequency $f_r$ and thereby being resonantly responsive to a preselected, distinct band of wavelengths $B_r$ of said wave induced subsurface water movement, and there being effectively only a hydrodynamical interaction, and no mechanical coupling, between any two distinct impellers $I_r$ and $I_s$ (where s = 1, 2, ..., n); and means coupled to said impeller means for performing useful work.

61. The apparatus of claim 2 or 48 or 53 or 57 or 60, wherein said apparatus includes:

first impeller means having a substantially large water movement effective volume-to-surface area ratio, and thereby responding principally to inertial forces of wave induced subsurface water movement; and second impeller means having a substantially small water movement effective volume-to-surface area ratio, and thereby responding principally to drag forces of wave induced subsurface water movement.

62. The apparatus of claim 2 or 48 or 50 or 57 or 60, wherein said apparatus includes pluralities of wave responsive impellers coupled to an outrigger means and having respectively different ranges of movement relative to said outrigger means, different depths of submergence below the surface of the water, and different horizontal locations with respect to a support means;

said outrigger means being attached to said support means and being positioned below the surface of the water; and said support means being adapted to be maintained at or below the surface of the water.

63. The apparatus of claim 2 or 48 or 50 or 57 or 60, wherein said apparatus includes pluralities of wave responsive impellers distributed in a series of generally concentric rings so as to form a three-dimensionally ordered, generally annular array of impellers effectively surrounding and thereby sheltering a given bounded central region at and below the surface of the water.

64. An apparatus for extracting wave energy from a large body of water, comprising:

an energy removing impeller positioned below the surface of the water and selectively responsive to the accelerated state of ambient wave induced subsurface water movement, said impeller comprising a series of n distinct working members $W_1, W_2, \ldots, W_n$ (the integer n being greater than 1), each of said working members $W_r$ (where r = 1, 2, ..., n) including means $M_r$ for selectively executing a corresponding predetermined, unique combination of contributions to the overall movement of said impeller in response, respectively, to drag forces and inertial forces simultaneously exerted upon said working member $W_r$ by said ambient wave induced subsurface water movement, the selective responsiveness of said executing means $M_r$ to said accelerated state of ambient wave induced subsurface water movement being dependent upon, respectively, (i) the degree to which each working member $W_r$ functions as a fluid reaction surface subjected to a water movement drag force, and (ii) the complementary degree to which said working member $W_r$ functions as a fluid reaction volume subjected to a water movement inertial force, and all of said working members $W_r$ being both rigid and rigidly interconnected; and means coupled to said impeller for performing useful work.

65. The apparatus of claim 2 or 44 or 48 or 50 or 60 or 64, wherein said impeller means includes (i) a first wave responsive portion that has a positive buoyancy in water and (ii) a second wave responsive portion that has a negative buoyancy in water.

66. The apparatus of claim 64, wherein the working members making up $n_1$ of said series of n distinct working members comprise first working members responding principally to inertial forces of said ambient wave induced subsurface water movement, and the working members making up the remaining $n_2$ of said series of n distinct working members comprise second working members responding principally to drag forces of said ambient wave induced subsurface water movement (each of the integers $n_1$ and $n_2$ being greater than zero and such that $n_1+n_2=n$).

67. The apparatus of claim 64, wherein the working members making up $n_1$ of said series of n distinct working members include first working members responding principally to inertial forces of said ambient wave induced subsurface water movement, the working members making up $n_2$ of the remainder of said series of n distinct working members include second working members responding principally to drag forces of said ambient wave induced subsurface water movement, and the working members making up the remaining $n_3$ of said series of n distinct working members include third working members responding approximately equally to inertial forces and drag forces of said ambient wave induced subsurface water movement (each of the integers $n_1$, $n_2$, and $n_3$ being greater than zero and such that $n_1+n_2+n_3=n$).

68. A method of extracting wave energy from a large body of water, comprising the steps of:
  exposing to wave induced subsurface water movement an energy removing impeller that is selectively responsive to the accelerated state of said wave induced subsurface water movement,
  said impeller comprising a series of n distinct, completely submerged working members $W_1, W_2, \ldots, W_n$ (the integer n being greater than 1),
  each of said working members $W_r$ (where $r=1, 2, \ldots, n$) including means $M_r$ for selectively executing a corresponding predetermined, unique combination of contributions to the overall movement of said impeller in response, respectively, to drag forces and inertial forces simultaneously exerted upon said working member $W_r$ by said wave induced subsurface water movement,
  the selective responsiveness of said executing means $M_r$ to the accelerated state of said wave induced subsurface water movement being dependent upon, respectively, (i) the degree to which each working member $W_r$ functions as a fluid reaction surface subjected to a water movement drag force, and (ii) the complementary degree to which said working member $W_r$ functions as a fluid reaction volume subjected to a water movement inertial force, and
  all of said working members $W_r$ being both rigid and rigidly interconnected;
  converting the resulting water movement drag forces and inertial forces exerted upon the respective working members $W_1, W_2, \ldots, W_n$ of said impeller to a composite force; and
  applying the composite force to a load.

69. A method of extracting wave energy from a large body of water, comprising the steps of exposing to wave induced subsurface water movement first impeller means that is responsive principally to inertial forces of wave induced subsurface water movement; exposing to the wave induced subsurface water movement second impeller means that is responsive principally to drag forces of wave induced subsurface water movement; exposing to the wave induced subsurface water movement third impeller means that is responsive approximately equally to inertial forces and drag forces of wave induced subsurface water movement; converting the resulting wave induced forces exerted upon said first, second, and third impeller means to a composite force; and applying the composite force to a load.

* * * * *